(12) United States Patent
Cohen et al.

(10) Patent No.: US 9,092,597 B2
(45) Date of Patent: Jul. 28, 2015

(54) STORAGE DEVICE AND METHOD FOR USING A VIRTUAL FILE IN A PUBLIC MEMORY AREA TO ACCESS A PLURALITY OF PROTECTED FILES IN A PRIVATE MEMORY AREA

(75) Inventors: Ehud Cohen, Rehovot (IL); Eyal Ittah, Alfe Menashe (IL); Lola Grin, Netanya (IL); Uri Peltz, Hod-Hasharon (IL); Irit Maor, Petach-Tiqva (IL); Yonatan Halevi, Mevaseret Zion (IL); Avraham Shmuel, Cupertino, CA (US)

(73) Assignee: SanDisk Technologies Inc., Plano, TX (US)

( * ) Notice: Subject to any disclaimer, the term of this patent is extended or adjusted under 35 U.S.C. 154(b) by 319 days.

(21) Appl. No.: 12/634,470

(22) Filed: Dec. 9, 2009

(65) Prior Publication Data

US 2011/0138487 A1    Jun. 9, 2011

(51) Int. Cl.

| | |
|---|---|
| G06F 21/00 | (2013.01) |
| G06F 21/10 | (2013.01) |
| G06F 21/31 | (2013.01) |
| G06F 21/62 | (2013.01) |
| G06F 21/79 | (2013.01) |
| G06F 3/06 | (2006.01) |

(52) U.S. Cl.
CPC ............... *G06F 21/10* (2013.01); *G06F 21/31* (2013.01); *G06F 21/6218* (2013.01); *G06F 21/79* (2013.01); *G06F 3/0622* (2013.01); *G06F 3/0644* (2013.01); *G06F 3/0676* (2013.01)

(58) Field of Classification Search
None
See application file for complete search history.

(56) References Cited

U.S. PATENT DOCUMENTS

| 6,466,944 B1 | 10/2002 | Stokes | |
|---|---|---|---|
| 6,574,618 B2 | 6/2003 | Eylon et al. | |
| 6,868,495 B1 * | 3/2005 | Glover | 713/190 |
| 6,941,456 B2 * | 9/2005 | Wilson | 713/160 |

(Continued)

FOREIGN PATENT DOCUMENTS

| CN | 101553783 A | 10/2009 |
|---|---|---|
| JP | 2005-063223 | 3/2005 |

(Continued)

OTHER PUBLICATIONS

Morris, Thomas H.; Nair, V.S.S. Secure Context Switch for Private Computing on Public Platforms. IEEE GLOBECOM 2008. Pub. Date: 2008. Relevant pp. 1-5. http://ieeexplore.ieee.org/stamp/stamp.jsp?tp=&arnumber=4698191L.*

(Continued)

*Primary Examiner* — Dede Zecher
*Assistant Examiner* — Jeremiah Avery
(74) *Attorney, Agent, or Firm* — Brinks Gilson & Lione

(57) ABSTRACT

A storage device and method for using a virtual file in a public memory area to access a plurality of protected files in a private memory area are disclosed. In one embodiment, a storage device receives a request from a host for access to a virtual file in the public memory area, wherein the virtual file is associated with a plurality of protected files stored in the private memory area. The storage device responds to the request by selecting and providing the host with access to one of the plurality of protected files stored in the private memory area. The storage device receives an additional request from the host for access to the virtual file and responds to the additional request by selecting and providing the host with access to a different one of the plurality of protected files stored in the private memory area.

28 Claims, 25 Drawing Sheets

(56) References Cited

U.S. PATENT DOCUMENTS

| | | | |
|---|---|---|---|
| 6,976,165 B1 * | 12/2005 | Carpentier et al. | 713/165 |
| 7,200,664 B2 | 4/2007 | Hayden | |
| 7,328,437 B2 | 2/2008 | Donovan et al. | |
| 7,376,740 B1 | 5/2008 | Porter et al. | |
| 7,392,234 B2 * | 6/2008 | Shaath et al. | 705/1.1 |
| 7,395,436 B1 * | 7/2008 | Nemovicher | 713/193 |
| 7,454,542 B2 * | 11/2008 | Illowsky et al. | 710/62 |
| 7,899,793 B2 * | 3/2011 | Mimatsu | 707/661 |
| 7,917,628 B2 * | 3/2011 | Hesselink et al. | 709/227 |
| 7,957,751 B2 | 6/2011 | Cone | |
| 8,090,690 B2 * | 1/2012 | Zamkoff et al. | 707/640 |
| 8,166,265 B1 | 4/2012 | Feathergill | |
| 8,301,694 B2 | 10/2012 | Ittah et al. | |
| 8,301,715 B2 | 10/2012 | Ittah et al. | |
| 8,332,951 B2 * | 12/2012 | Chakra et al. | 726/26 |
| 8,560,852 B2 * | 10/2013 | HongQian et al. | 713/172 |
| 2002/0099798 A1 | 7/2002 | Fedorovsky et al. | |
| 2002/0157010 A1 | 10/2002 | Dayan et al. | |
| 2003/0212542 A1 | 11/2003 | Lee et al. | |
| 2004/0230972 A1 | 11/2004 | Donovan et al. | |
| 2005/0240993 A1 | 10/2005 | Treadwell et al. | |
| 2005/0281404 A1 | 12/2005 | Yu | |
| 2006/0129496 A1 | 6/2006 | Chow et al. | |
| 2006/0161725 A1 | 7/2006 | Lee et al. | |
| 2006/0167985 A1 | 7/2006 | Albanese et al. | |
| 2007/0110074 A1 | 5/2007 | Bradley et al. | |
| 2007/0143555 A1 | 6/2007 | Nemiroff et al. | |
| 2007/0220021 A1 | 9/2007 | Kato et al. | |
| 2007/0250761 A1 | 10/2007 | Bradley et al. | |
| 2007/0288535 A1 | 12/2007 | Shitomi et al. | |
| 2008/0045232 A1 | 2/2008 | Cone | |
| 2008/0098023 A1 | 4/2008 | Araki et al. | |
| 2008/0133564 A1 | 6/2008 | Gandolph et al. | |
| 2008/0177994 A1 * | 7/2008 | Mayer | 713/2 |
| 2008/0195797 A1 * | 8/2008 | Sherman et al. | 711/103 |
| 2008/0244713 A1 | 10/2008 | Jogand-Coulomb | |
| 2008/0276058 A1 | 11/2008 | Mosek | |
| 2009/0104954 A1 | 4/2009 | Weber et al. | |
| 2009/0119782 A1 | 5/2009 | Mardiks | |
| 2009/0171679 A1 | 7/2009 | Salgado | |
| 2009/0171715 A1 | 7/2009 | Conley et al. | |
| 2009/0187645 A1 | 7/2009 | Hayden et al. | |
| 2009/0287837 A1 * | 11/2009 | Felsher | 709/229 |
| 2010/0146393 A1 | 6/2010 | Land et al. | |
| 2010/0269108 A1 | 10/2010 | Boudreau et al. | |
| 2010/0274772 A1 * | 10/2010 | Samuels | 707/693 |
| 2010/0312823 A1 | 12/2010 | Titus | |
| 2011/0138487 A1 | 6/2011 | Cohen et al. | |
| 2011/0289137 A1 | 11/2011 | Ittah et al. | |
| 2011/0289178 A1 | 11/2011 | Ittah et al. | |

FOREIGN PATENT DOCUMENTS

| | | |
|---|---|---|
| JP | 2005-301853 | 10/2005 |
| JP | 2007-043336 | 2/2007 |
| JP | 2009-282624 | 10/2009 |
| WO | WO 2008/082949 | 7/2008 |
| WO | WO2008/135969 | 11/2008 |
| WO | WO 2009/085122 | 7/2009 |

OTHER PUBLICATIONS

Liu, Mengxiao; Ji, Weixing; Wang, Zuo; Li, Jiaxin; Pu, Xing. High Performance Memory Management for a Multi-core Architecture. Ninth IEEE International Conference on Computer and Information Technology, 2009. CIT '09. vol. 1. Pub. Date: 2009. Relevant pp. 63-68. http://ieeexplore.ieee.org/stamp/stamp.jsp?tp=&arnumber=5329296.*

International Search Report and Written Opinion for PCT/US2010/057438, dated Mar. 22, 2011, 9 pages.

Arcangeli, A., "O_DIRECT", *UKUUG Manchester*, Jun. 29-Jul. 1, 2001, pp. 1-6, printed on Apr. 15, 2010 from http://ukuug.org/events/linux2001/papers/html/AArcangeli-o_direct.html.

Fielding, et al., "Hypertext Transfer Protocol-HTTP/1.1", *RFC 2616* pp. 1-5, printed on Apr. 15, 2010 from http://www.w3.org/Protocols/rfc2616/rfc2616-sec9.html.

"Linux: Accessing Files With O_DIRECT", *Kernel Trap*, Jan. 11, 2007, pp. 1-19, printed on Apr. 15, 2010 frorm http://kerneltrap.org/node/7563.

"Linux: O-STREAMING-Optimal Streaming I/O", *Kernel Trap*, Oct. 12, 2002, pp. 1-10, printed on Apr. 15, 2010 from http://kerneltrap.org/node/460.

International Search Report and Written Opinion for PCT/US2011/033609, dated Oct. 11, 2011, 9 pages.

"Host Device and Method for Accessing Virtual File in a Storage Device by Bypassing a Cache in the Host Device", U.S. Appl. No. 12/797,513, filed Jun. 9, 2010, Inventors: Eyal Ittah, Judah Gamliel Hahn, Yehuda Drori, Joseph Meza, In-Soo Yoon, and Ofir Cooper.

Office Action for U.S. Appl. No. 12/634,470, dated Apr. 24, 2012, 13 pages.

Office Action for U.S. Appl. No. 12/797,513, dated Mar. 29, 2012, 7 pages.

Office Action for U.S. Appl. No. 12/826,626, dated Mar. 29, 2012, 6 pages.

Notice of Allowance for U.S. Appl. No. 12/797,513, dated Aug. 16, 2012, 9 pages.

Notice of Allowance for U.S. Appl. No. 12/797,513, dated Sep. 5, 2012, 9 pages.

Notice of Allowance for U.S. Appl. No. 12/826,626, dated Aug. 21, 2012, 9 pages.

Office Action for U.S. Appl. No. 13/436,343, dated Jun. 7, 2013, 9 pages.

Office Action for U.S. Appl. No. 13/436,373, dated May 21, 2013, 11 pages.

Notice of Allowance for U.S. Appl. No. 13/436,373 dated Sep. 26, 2013, 10 pages.

Notice of Allowance for U.S. Appl. No. 13/436,343 dated Oct. 24, 2013, 11 pages.

Notification of Reasons for Rejection for Japanese Patent Application Serial No. 2012-543134 dated Apr. 15, 2014, 3 pages.

English Translation of Office Action for Chinese Patent Application Serial No. 201180025023.2 dated Nov. 4, 2014, 10 pages.

* cited by examiner

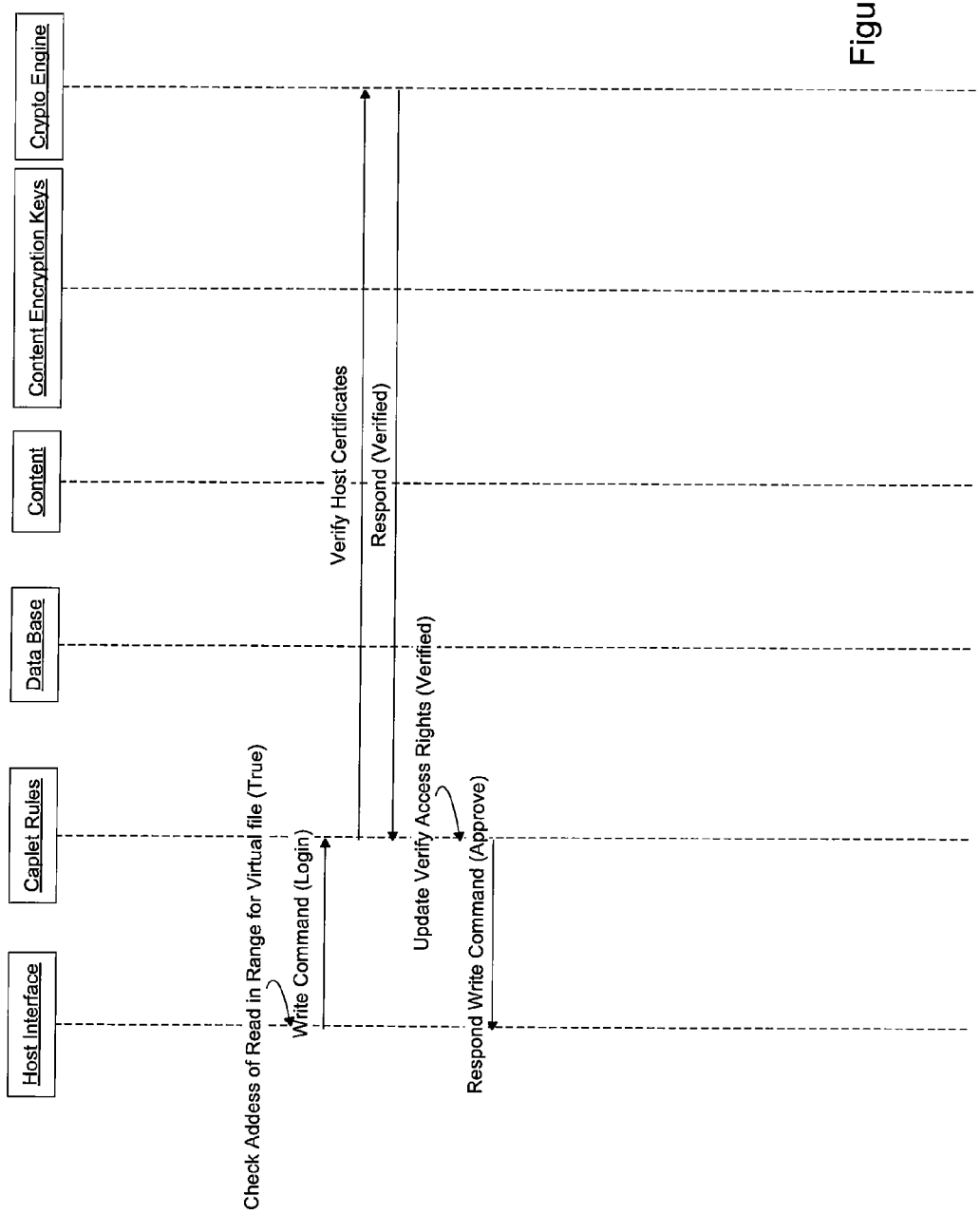

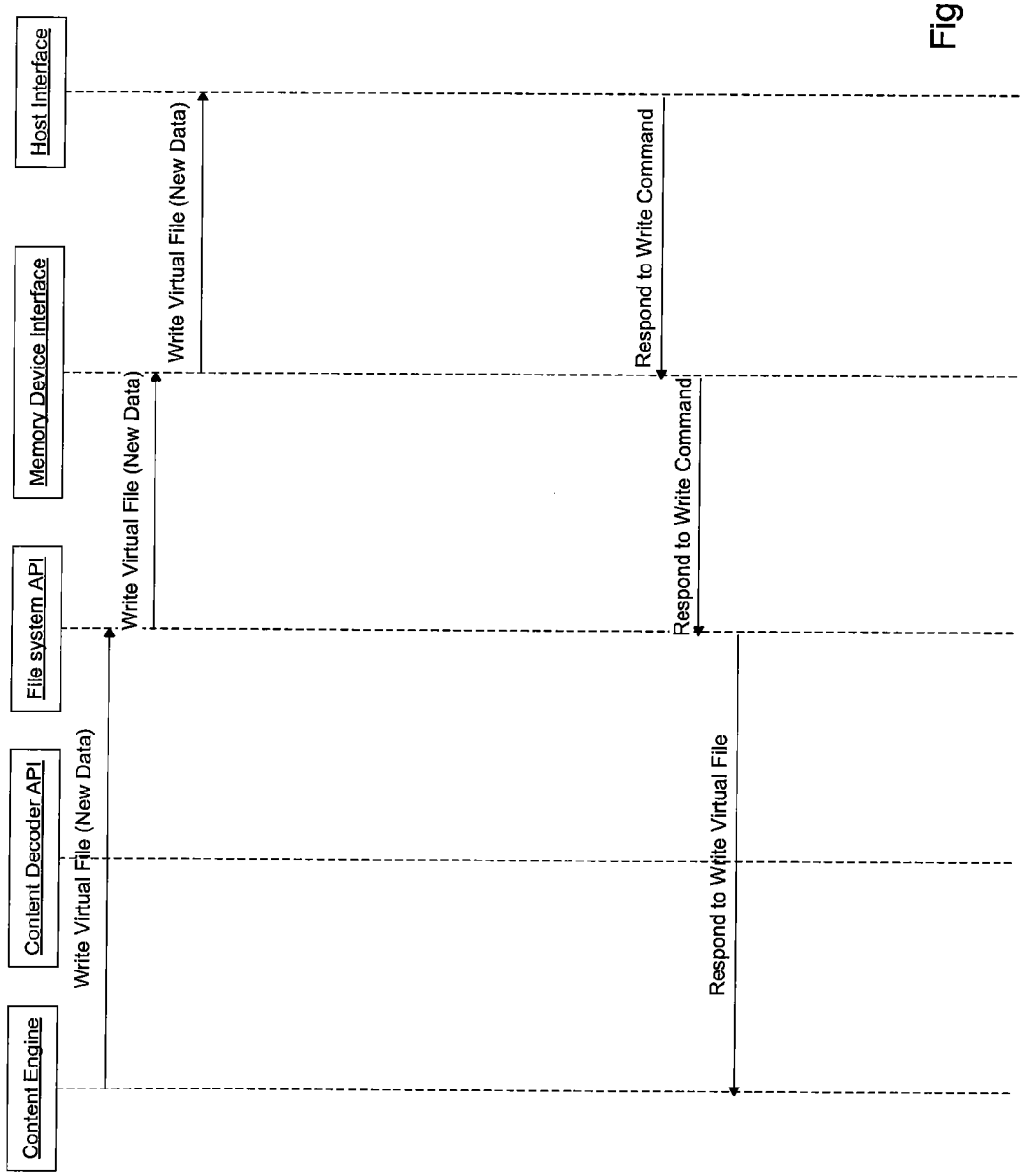

STORAGE DEVICE AND METHOD FOR USING A VIRTUAL FILE IN A PUBLIC MEMORY AREA TO ACCESS A PLURALITY OF PROTECTED FILES IN A PRIVATE MEMORY AREA

BACKGROUND

Storage devices, such as memory cards, are often used to store content, such as digital audio (e.g., music) and/or video (e.g., movies) files. To protect content from unauthorized access, the content can be stored in a private memory area in the storage device, which is accessible only by authenticated hosts. In general, a host presents its credentials to the storage device for authentication. If the host is authenticated, the storage device allows the host to access the content stored in the private memory area. While this security system prevents unauthorized hosts from accessing the content stored in the private memory area, a problem can occur if an authenticated host has a virus or other malicious software on it. In that situation, once the authenticated host is allowed access to the private memory area, malicious software on the host can take advantage of that access to perform unauthorized acts on the data stored in the private memory area.

SUMMARY

Embodiments of the present invention are defined by the claims, and nothing in this section should be taken as a limitation on those claims.

By way of example, the embodiments described below generally relate to a storage device and method for using a virtual file in a public memory area to access a plurality of protected files in a private memory area. In one embodiment, a storage device receives a request from a host for access to a virtual file in the public memory area, wherein the virtual file is associated with a plurality of protected files stored in the private memory area. The storage device responds to the request by selecting and providing the host with access to one of the plurality of protected files stored in the private memory area. The storage device receives an additional request from the host for access to the virtual file and responds to the additional request by selecting and providing the host with access to a different one of the plurality of protected files stored in the private memory area.

Other embodiments are provided, and each of the embodiments can be used alone or together in combination. Various embodiments will now be described with reference to the attached drawings.

BRIEF DESCRIPTION OF THE DRAWINGS

FIGS. 4A and 4B are flow diagrams of a log-in process of an embodiment.

FIGS. 14A and 14B are flow diagrams of a process of an embodiment for adding content.

DETAILED DESCRIPTION OF THE PRESENTLY PREFERRED EMBODIMENTS

Introduction

The following embodiments generally relate to a storage device and method for using a virtual file in a public memory area to access a plurality of protected files in a private memory area. In these embodiments, the public memory area contains a virtual file that acts as a gateway to the plurality of protected files in the private memory area. When a controller in the storage device detects that the host is attempting to access the virtual file (e.g., from an attempt to access the logical block addresses of the virtual file), the controller determines which of the plurality of protected files, if any, should be provided to the host.

There are several advantages associated with these embodiments. For instance, Java and other predefined application program interfaces (APIs) (such as those used in many handheld devices and mobile phones) only allow file-based commands and do not use low-level commands that can be used to control the storage device to provide access to a specific protected file in the private memory area. That is why some storage devices may grant the host access to the entire private memory area, which can lead to unauthorized actions when malicious software on the host takes advantage of this open access to the private storage area. While a proprietary API can be written that supports streaming of a protected file out of the private storage area, relatively few mobile devices would permit such an API. Using the virtual file in the public memory area as a gateway to protected files in the private memory area overcomes this problem, since the file-based commands used by Java and other predefined APIs can be used to access the virtual file, with the controller in the storage device taking responsibility for selecting and providing the host with access to the appropriate protected file. In this way, these embodiments provide a generic solution that can be used on multiple hosts as well as on different operating system, all while enabling the storage device to control streaming of data in to and out of the storage device in a secured way.

Exemplary Virtual File Embodiments

Figure 1:
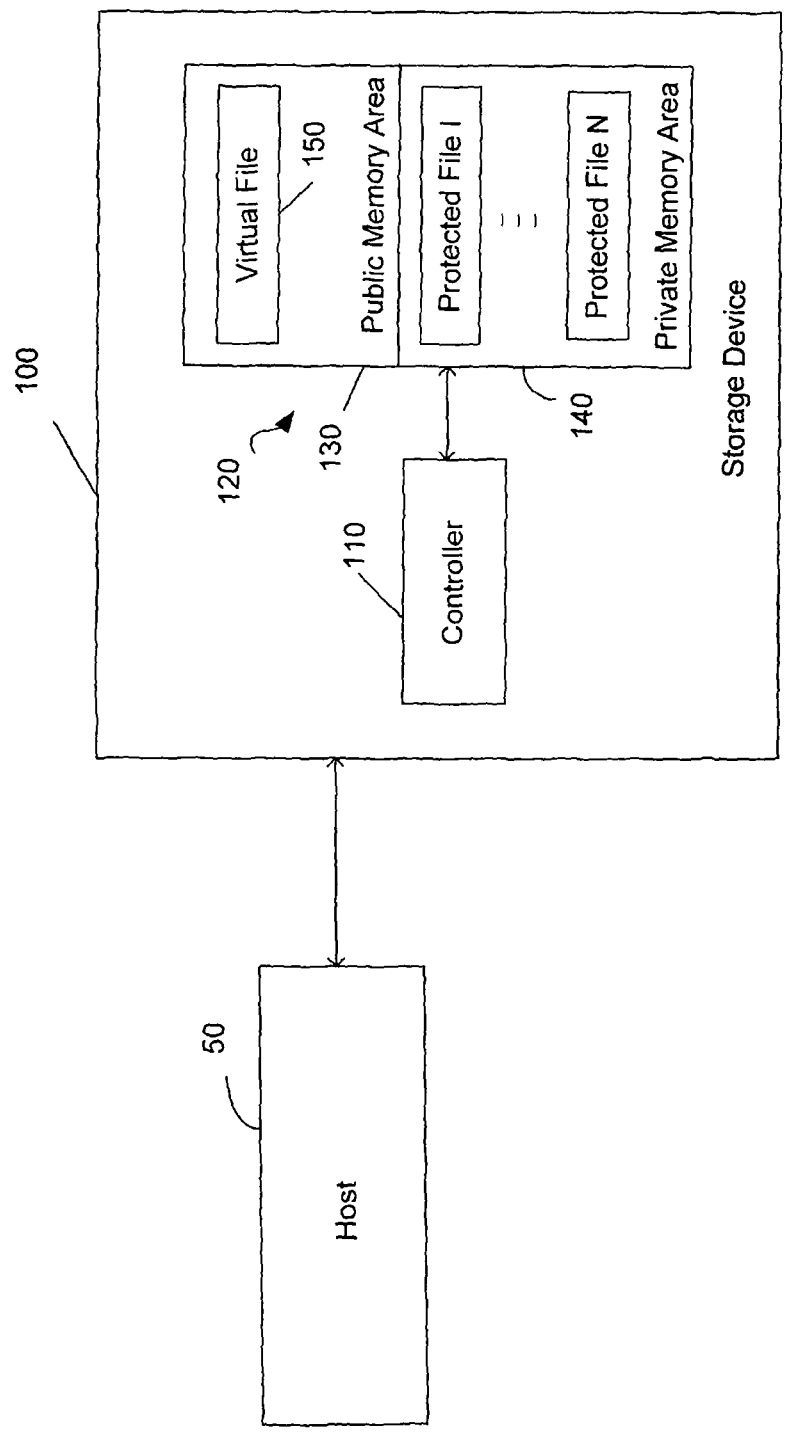
FIG. 1 is a block diagram of a host and a storage device of an embodiment.

Turning now to the drawings, FIG. 1 is a block diagram of a host 50 in communication with a storage device 100 of an embodiment. As used herein, the phrase "in communication with" means directly in communication with or indirectly in communication with through one or more components, which may or may not be shown or described herein. The host 50 can take any suitable form, such as, but not limited to, a dedicated content player, a mobile phone, a personal computer (PC), a game device, a personal digital assistant (PDA), a kiosk, and a TV system. The storage device 100 can also take any suitable form, such as, but not limited to, a handheld, removable memory card (e.g., a flash storage card), a universal serial bus (USB) device, and a solid-state drive. Preferably, the storage device 100 is removably connected to the host 50, so a user can use the storage device 100 with a variety of hosts.

As shown in FIG. 1, the storage device 100 comprises a controller 110 and a memory 120. The controller 110 can be implemented in any suitable manner. For example, the controller 110 can take the form of a microprocessor or processor and a computer-readable medium that stores computer-readable program code (e.g., software or firmware) executable by the (micro) processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. Examples of various components that can be used in a controller are described in the embodiments discussed below and are shown in the associated drawings. The controller 110 can also be implemented as part of the memory control logic.

As also shown in FIG. 1, the storage device 100 comprises a memory 120, which can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. Although shown as single components in FIG. 1, the controller 110 and/or memory 120 can be implemented with several components. In FIG. 1, the memory 120 comprises a public memory area 130 and a private memory area 140. In this embodiment, the public and private memory areas 130, 140 are different partitions of a single memory device; however, in other embodiments, the public and private memory areas 130, 140 are different memory devices. The public memory area 130 is generally accessible without restriction, while the private memory area 140 can only be accessed by authorized entities and is typically invisible to a host (e.g., a hidden partition). As such, the private memory area 140 can be used to store a plurality of content files (here, files 1-N) that should only be accessed by authorized entities. A "content file" can take any suitable form, such as, but not limited to, digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game or other software, and a hybrid multi-media presentation of two or more of these forms. The terms "content," "content file," and "file" will be used interchangeably herein, and a file stored in the private memory area 140 will be referred to as a "protected file."

In this embodiment, the public memory area 130 contains a virtual file 150. The virtual file 150 is "virtual" in the sense that it exists as allocated logical block addresses in the file allocation table (FAT) for the public memory area 130 but it does not contain any data and is not actually accessible. There may not even be any physical storage locations allocated in the public memory area 130 for the virtual file 150 (although, as discussed below, in some embodiments, a relatively small amount of physical storage locations (e.g., 15 MB) may be allocated in the public memory area 130 for the virtual file 150). However, since the virtual file 150 has logical block addresses allocated to it the FAT table in the public memory area 130, the virtual file 150 will appear as a regular file to the host 50.

In this embodiment, the virtual file 150 serves as a gateway to the plurality of protected files 1-N in the private memory area 140. That is, when the controller 110 recognizes that an attempt is being made to access the virtual file 150 (e.g., from logical block addresses specified in a read command), the controller 110 will take a special action instead of providing the host 50 with access to the virtual file 150 itself. For example, when the controller 110 receives a request from the host 50 for access to the virtual file 150, the controller 110 can select one of the plurality of protected files 1-N stored in the private memory area 140 and respond to the request by providing the host 50 with access to the selected protected file. When the same virtual file 150 is later accessed, the controller 110 can select and provide access to a different one of the plurality of protected files 1-N. For example, if the virtual file 150 is named "audio.MP3" and is associated with a playlist of 20 songs stored in the private memory area 140, every time the host 50 requests access to "audio.MP3," the controller 110 can select and provide access to another song on the playlist.

Figure 2:
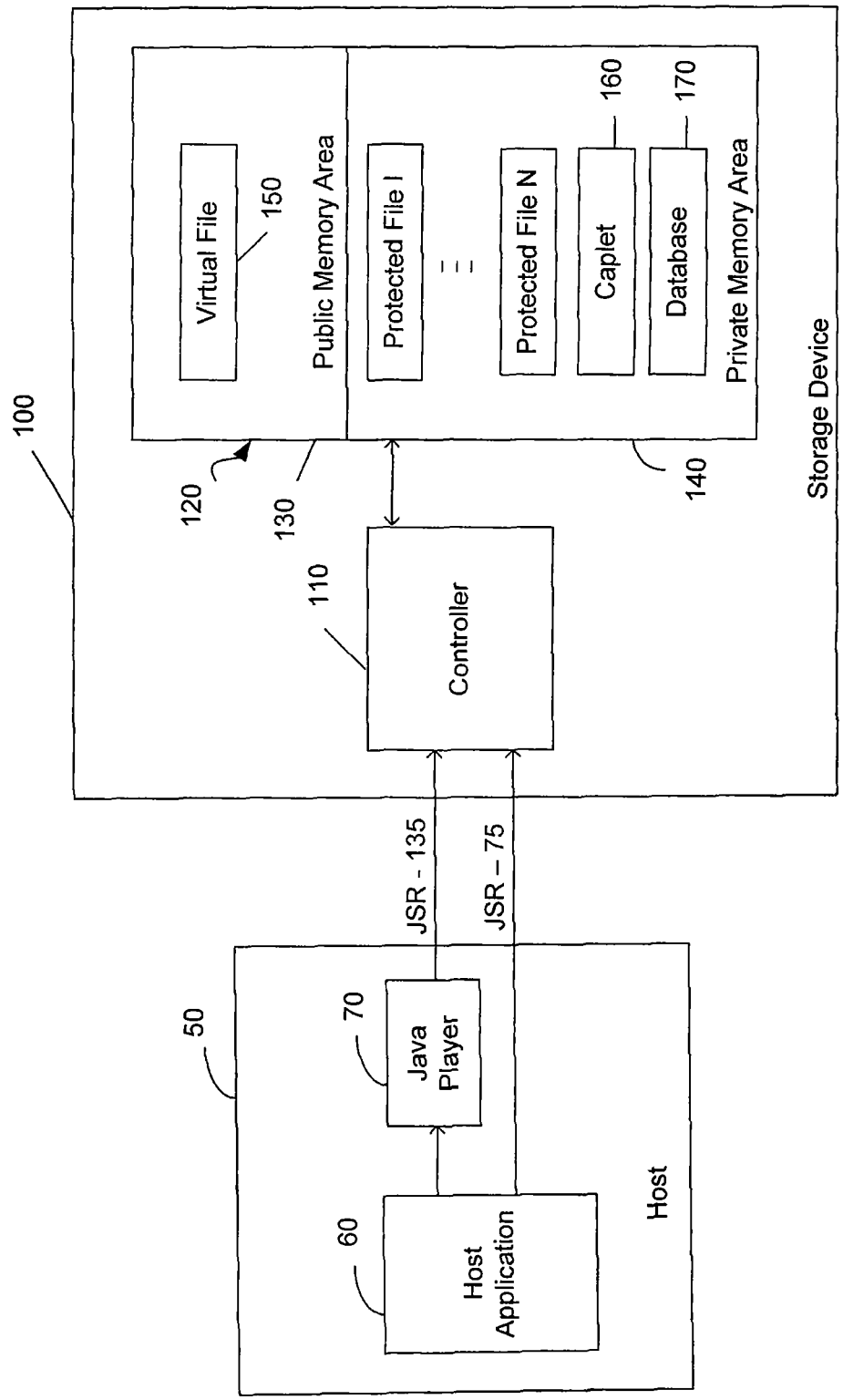
FIG. 2 is a block diagram of a host and a storage device of an embodiment.

Any suitable implementation can be used to allow the controller 110 to handle a host request for the virtual file 150. For example, in one embodiment shown in FIG. 2, an application (or caplet 160) stores a set of rules that determines the way the controller 110 manages the protected content in the private memory area 140 (e.g., what protected content to access and when). In this embodiment, the caplet 160 is stored in the private memory area 140 to prevent a hacker from tampering with the set of rules. The controller 110 uses the set of rules in the caplet 160 to determine how to react to a request from the host 50 to access the virtual file 150. The private memory area 140 also stores a database 170 that associates the plurality of protected files 1-N with the virtual file 150. In this way, the database 170 acts as a playlist of the plurality of protected files 1-N. In one embodiment, the database 170 is preloaded into the storage device 100 along with the plurality of protected files 1-N. If the database 170 is encrypted, the caplet 160 can hold the key to decrypt the database 170.

In operation, when the storage device 100 is powered-up, the caplet 160 programs the controller 110 to control access attempts made by the host 50 to the virtual file 150 according to the preloaded database 170. For example, in response to a request to access the virtual file 150, the controller 110 can select and provide access to one of the plurality for protected files 1-N based on the database 170. As another example, the controller 110 can determine whether the host 50 is authorized or unauthorized and can provide access to different types of content accordingly, which may be desirable if the storage device 100 is a portable memory card that can be used with a variety of hosts that may or may not be authorized. So, if the host 50 is an authorized player, the controller 110 can respond to the request from the host 50 to access the virtual file 150 by providing access to protected content. Otherwise, the controller 110 can respond to the host request by providing access to an alternate file. In this way, the set of rules can specify that the controller 110 should provide access to a protected file (e.g., a movie) if an application on the host 50 is authorized; otherwise, the controller 110 can provide access to an alternate file (e.g., a trailer for the movie), which may be stored in the public or private memory areas 130, 140. In this way, a similar host request to access the virtual file 150 can be handled differently by the controller 110 based on whether the host 50 is an authorized or unauthorized entity (e.g., the storage device 100 can return a dedicated commercial if the user has not logged-in or has not been authenticated by the storage device 100). Of course, this is just one example, and other types of rules and conditions can be used. For example, the selection of the file can be based on time, information about the user, whether and how the host logged into the storage device 50, or any other suitable condition. As seen from these examples, the virtual file 150 can be treated differently in different situations, and a single virtual file 150 in the public memory area 130 can be used to provide access to one or more protected files in the private memory area 140.

Returning now to FIG. 2, in this embodiment, the host 50 runs a host application 60 and a media player (here, a Java player 70). The host application 60 controls the Java player 70 and also sends additional instructions to the controller 110 of the storage device 100, which will be described below. As mentioned above, in this embodiment, a virtual file 150 (e.g., named "audio.MP3") is associated with the plurality of protected files 1-N stored in the private memory area 140. Every time the host 50 request access to "audio.MP3," the controller 110 can select and provide access to a different one of the plurality of protected files 1-N. In this embodiment, the size of the virtual file 150 is at least as large as the size of the largest protected file in the private memory area 140. If the selected protected content is smaller than the size of the virtual file 150, the controller 110 can pad the content with valid data, so that the Java player 70 in the host 50 does not malfunction. For example, if the protected file is an audio file, the controller 110 can, on the fly, pad the audio file with valid data, such as silent MP3 frames or expected header information. This is done to be able to support different host cache-ahead mechanisms. To prevent the controller 110 from playing the padded data, the controller 110 can inform the host 50 of the actual play length of the file, and the host 50 can stop the playback of the file before it reaches the padded data.

Consider an example in which the Java player 70 sends a request to the storage device 110 using the JSR-135 protocol to read the virtual file 150, which it thinks is an audio file. The controller 110 in the storage device 100 detects that an attempt is being made to access the virtual file 150 (e.g., from the logical block address specified in the request) and, based on the rule in the caplet 160, the controller 110 selects and provides the Java player 70 with access to Song A. The controller 100 also informs the host application 60 of the actual size of Song A, which may be less than the size of the virtual file 150, as discussed above. The host application 60 monitors the playback and when Song A is complete, the host application 60 sends a command to the controller 110 via the JSR-75 protocol to stop streaming data and to skip to the next song. (The JSR-135 protocol does not support this type of command.) In response to this command, the controller 110 updates the database 170 to point to the next song (Song B). The host application 60 instructs the Java player 70 to again request access to the virtual file 150. However, this time, the controller 110 selects and provides the Java player 70 with access to Song B (not Song A). The process described above then repeats as the Java player 70 continues to request playback of additional songs.

There are many alternatives that can be used with these embodiments. For example, in one embodiment, the storage device 100 uses a "dedicated file system" for playback of preloaded protected files to minimize the time it takes the storage device 100 to locate and access the preloaded protected files and to minimize the time it takes to extract details on the preloaded protected files (e.g., track name, artist name, album name, track duration, etc.). In this way, time to access the virtual file 150 should be about the same as the time to access another type of file, in spite of the controller 110 overhead involved in providing the gateway functionality to the protected files. To implement this dedicated file system, protected files can be preloaded into the private memory area 140 in continuous logical block address (LBA) order. Tables can then be built during production to specify the exact starting LBA for each protected file, along with any other relevant data, such as file duration. Because reading such tables is faster than opening files to gather needed information, the use of this dedicated file system provides a faster response time.

As understood from the above description, the "dedicated file system" can be used to reduce the amount of time that is required for locating and accessing different preloaded content. This can be done by defining a dedicated structure (e.g., a table) for saving, in a specific way, only the needed data for playback. This data can change between different products according to product-specific requirements (e.g., track name, artist name, album name, track duration, etc.). This data structure can be preloaded into a secure location in the storage device 100, in continuous LBA order, with the tables holding the data located in the exact starting LBA for each file alongside other data specified before. Every entry in the table can represent a specific file which can be identified using a entry key in the table. Upon a request to access a specific file, the file is located in the table, and the relevant data is retrieved. For example, playing a song from the beginning using the virtual file 150 may require knowledge of the starting LBA of the file, its actual duration, and the album name to be displayed. In this way of handling files, the required amount of time to locate and playback a file dramatically decreases as compared to the time needed to handle a FAT table and parse the file content.

As another alternative to provide a faster response time, the storage device 100 can support the use of a "compound command." A compound command is a single command that incorporates two or more commands that control different aspects of the playback system, such as, for example, changing both the virtual file state and the song that is being played. The use of compound commands may be especially desirable in environments, such as audio streaming, where a fast response time is desired. For example, a compound command can specify "skip channel" and "skip two songs ahead" or "skip song and go into pause." In many situations, several mode changes may need to occur at the same time. For example, the sequence of "playing a song, going into pause mode, then skipping to the next song" may require the next song to start instantly after the skip occur. In this case, two commands may need to be sent over the bus in order for this change to take place. In another example, different aspects of the system may need to be controlled at the same time, such as changing both the virtual file state and the song that is being played. Again, the idea is to reduce the amount of time needed for handling state changes on the storage device 100 and the amount of time it takes to transport the command from the host 50 to the storage device 100 and back.

In yet another alternative, instead of allocating actual memory in the public memory area 130 for the virtual file 150, memory consumption can be reduced by having the public memory area 130 emulate itself to the host 50 as an extended storage area, so that a host request to the extended (emulated) storage area is handled by the controller 110 as if it were a host request to the private memory area 140 of the storage device. As a result, the virtual file 150 does not consume real memory in the public memory area 130. This allows storing large files (e.g., movies) without consuming valuable memory. Consider, for example, the situation in which the virtual file 150 is 15 MB and the public memory area 130 is 30 MB. Using the technique described above, the storage device 100 can identify itself as having a 45 MB public memory area 130, in which 30 MB are mapped to physical addresses and 15 MB are not.

While the examples discussed above relate to reading a protected file out of the storage device, in an alternate embodiment, the virtual file 150 is used to add new content in the private memory area 140, if the host 50 is authorized to do so. For example, when a user buys a song, the host application 70 can control the private memory area 140 to add new content in its free space and then use the virtual file 150 to write the new song data to the private memory area 140. In another example, a stored commercial can be updated to a new commercial. This can be achieved by linking the virtual file 150 to this private file and then changing its content by writing to the virtual file 150. The storage device 100 can intercept the write command and channel the write operation to the correct place on the private memory area 140. This enables updating the private memory area 140 to hold updated content and purchased content in a secure way Additional alternatives relate to copy protection mechanisms. Because the virtual file 150 is accessible in the public memory area 130, the virtual file 150 can be easily copied by a simple copy command from any host. The following alternatives can be used to prevent copying of the virtual file 150, thereby assuring that access to protected content stored in the private memory area 140 is only given to an authenticated entity allowed to access the content. Otherwise, the host 50 can simply copy the virtual file 150 to another address range in the public memory area 130 and freely access the protected content.

One exemplary copy protection mechanism uses an encryption scheme to encrypt the protected content sent out of the storage device 100 by read operations of the virtual file 150. This can be done by using a session key that is updated each time an authentication process is applied between the host application 60 and the storage device 100 (e.g., during log in). This session key is known both to the host 50 and the storage device 100, so the storage device 100 can use the session key to encrypt the protected content, and the host 50 can use the session key to decrypt the protected content. The use of the session key in this way creates a secure channel between the storage device 100 and the host application 60.

Another exemplary copy protection mechanism uses a counter in the storage device 100 to count sectors that have been read by the host 50. When the counter reaches zero, the storage device 100 can start sending buffers of silent audio. The host 50, after proper authentication, can instruct the storage device 100, over playback time, to increase the counter. This operation of setting the counter can be done during the reading of the file (e.g., during playback of a song). In case an attempt to copy the file is made, the storage device 100 can detect the attempt and start returning invalid data to the host 50. This prevents copying of the song because a hacker can only retrieve a certain amount of the song (e.g., 1 MB of audio of a 5 MB song) without the counter being increased.

In yet another exemplary copy protection mechanism, a data rate control ("DRC") is enforced by the storage device 100 after examining a pattern of read operations from the host 50 to the virtual file 150. If these read operations do not occur as expected (e.g., the storage device 100 detects that copying of the virtual file 150 is taking place due to fast and rapid file access), the storage device 100 can return invalid data or fail the read process. In this way, the storage device 100 enforces data rate control on the protected file read from the storage device 100. The host 50 may be able to configure the storage device DRC mechanism to fit the specific traits of the current host 50 after having proper authentication to the storage device 100.

A "sliding window" can also be used as an exemplary copy protection scheme. With this mechanism, the storage device 100 allows the host 50 to read real data only within a specific LBA range. Accessing data outside this LBA range returns buffers of silent audio. The host 50 can reconfigure the allowed range, after proper authentication. Since the allowed range moves, it is referred to here as a "sliding window." The concept of the counter discussed above can be used as a sliding window (e.g., copy from 1 to 500 for now), or playback of data can be allowed from only a specific location inside the virtual file 150.

In yet another embodiment, the virtual file 150 can be used for playback from native media players. This can be done by using a relatively large virtual file for each playlist of content. This virtual file can be concatenate on-the-fly song-after-song. The storage device 100 can also provide an ID3 tag for each channel of content to be displayed in the host native player. In this way, the storage device 100 can be used on each host (e.g., handset) or operating system that is available. This solution can be enhanced by allowing the storage device a way to sense attempts to skip a song (e.g., by detecting when the user tries to fast-forward/rewind/drag the progress bar).

Exemplary Storage Device and Process Flows

As noted above, the storage device of these embodiments can be implemented in any suitable manner. The following paragraphs and referenced drawings describe one exemplary implementation. It should be understood that this implementation is merely an example and that details shown and described herein should not be read into the claims unless explicitly recited therein.

Figure 3A:
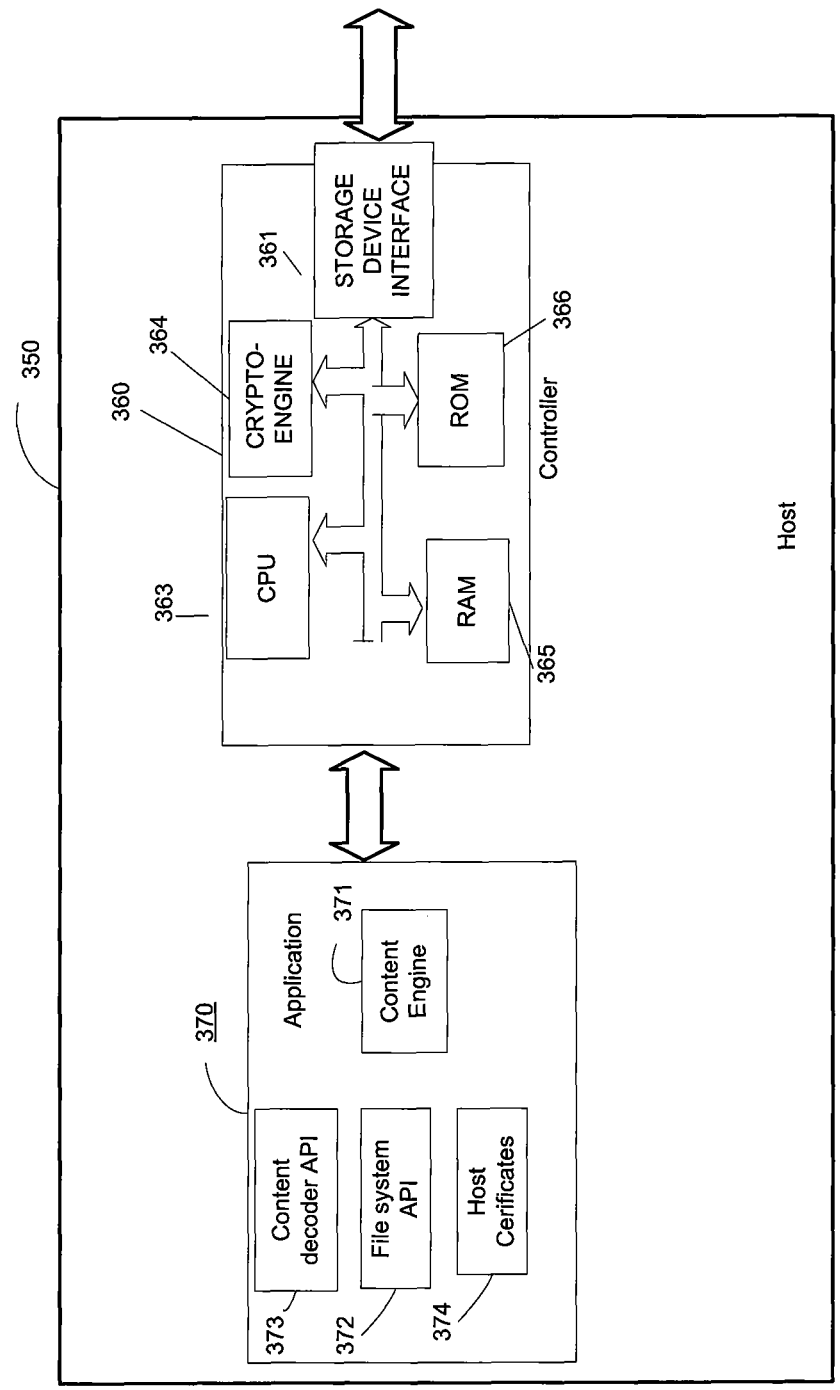
FIG. 3A is a block diagram of a host of an embodiment.
Figure 3B:
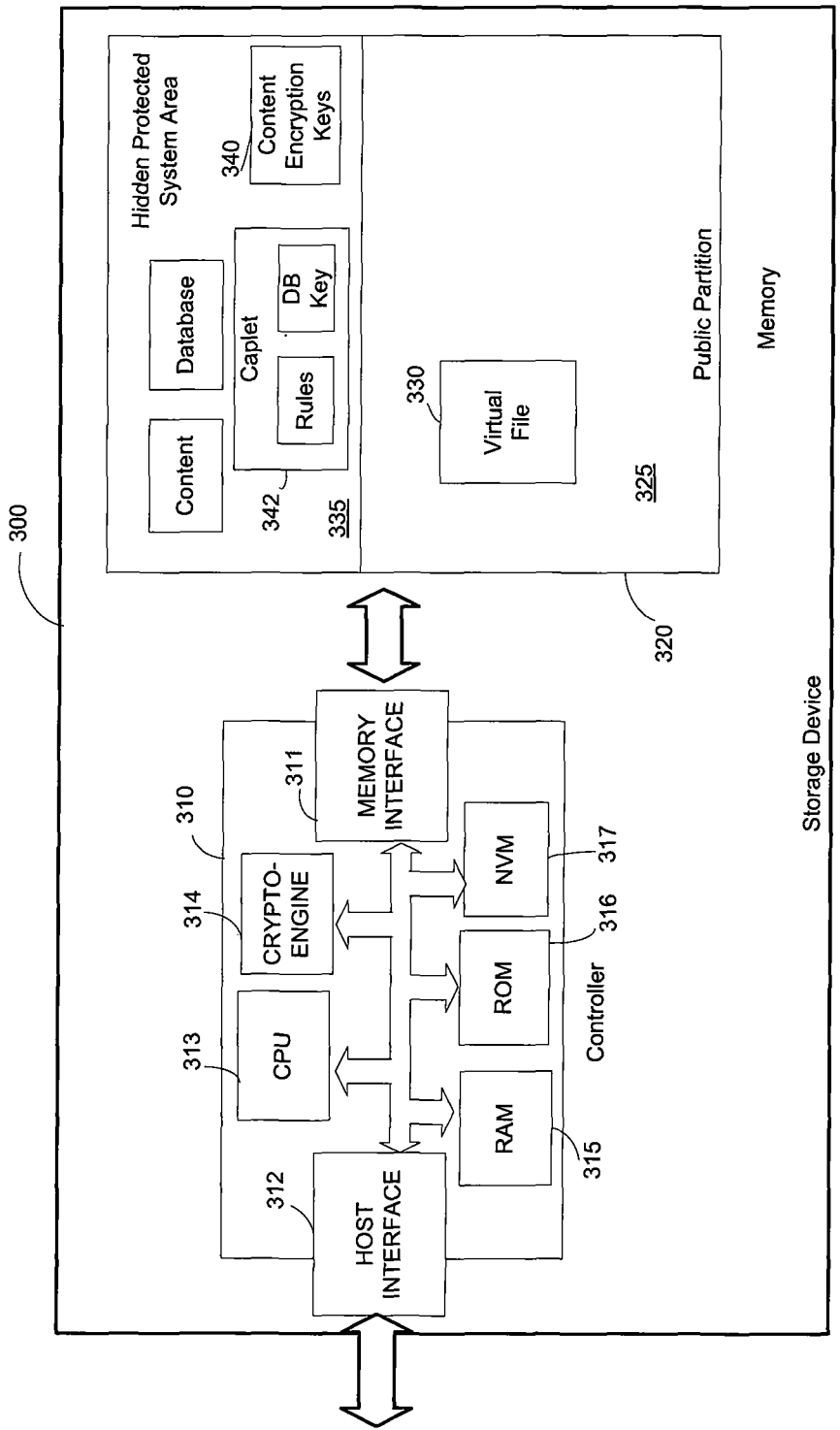
FIG. 3B is a block diagram of a storage device of an embodiment.

Returning to the drawings, FIGS. 3A and 3B are block diagrams of a storage device 300 and host 350 of an embodiment. Starting first with FIG. 3B, the storage device 300 comprises a controller 310 and a memory 320. The controller 310 comprises a memory interface 311 for interfacing with the memory 320 and a host interface 312 for interfacing with the host 350. The controller 310 also comprises a central processing unit (CPU) 313, a crypto-engine 314 operative to provide encryption and/or decryption operations, read access memory (RAM) 315, read only memory (ROM) 316 which stores firmware (logic) for the basic operations of the storage device 300, and a non-volatile memory (NVM) 317 which stores a device-specific key used for encryption/decryption operations. It should be noted that the storage device-specific key can be stored in other memory areas within the storage device. The components shown in FIG. 3B can be implemented in any suitable manner.

In this embodiment, the memory 320 comprises a public partition 325 that is managed by a file system on the host 350 and a hidden protected system area 335 that is internally managed by the controller 310. The hidden protected system area 335 stores content encryption keys (CEKs) 340, content, a database, and a caplet 342, as discussed above. The hidden protected system area 335 is "hidden" because it is internally managed by the controller 310 (and not by the host controller 360) and is "protected" because objects stored in that area 335 are encrypted with the unique key stored in the non-volatile memory 317 of the controller 310. (The storage device hardware unique key can be stored in the non-volatile memory 317 of the controller 310 or other areas within the storage device 300.) Accordingly, to access objects stored in that area 335, the controller 310 would use the crypto-engine 314 and the key stored in the non-volatile memory 317 to decrypt the encrypted objects. Preferably, the storage device 300 takes the form of a secure product from the family of products built on the TrustedFlash™ platform by SanDisk Corporation. The public partition 325 contains the virtual file 330.

Turning now to the host 350 in FIG. 3A, the host 350 comprises a controller 360 that has a storage device interface 361 for interfacing with the storage device 300. The controller 360 also comprises a central processing unit (CPU) 363, a crypto-engine 364 operative to provide encryption and/or decryption operations, read access memory (RAM) 365, and read only memory (ROM) 366. It should be noted that each component in box 360 can be implemented as separate chips in the overall host system. The host 350 also comprises an application 370 comprising a content engine 371, a file system API 372, a content decoder API 373, and host certificates 374.

The storage device 300 and the host 350 communicate with each other via the storage device interface 361 and the host interface 312. For operations that involve the secure transfer of data, it is preferred that the crypto-engines 314, 364 in the storage device 300 and host 350 be used to mutually authenticate each other and provide a key exchange. The mutual authentication process calls for the host 350 and storage device 300 to exchange unique certification IDs. After mutual authentication is complete, it is preferred that a session key be used to establish a secure channel for communication between the storage device 350 and host 300.

Figure 4A:
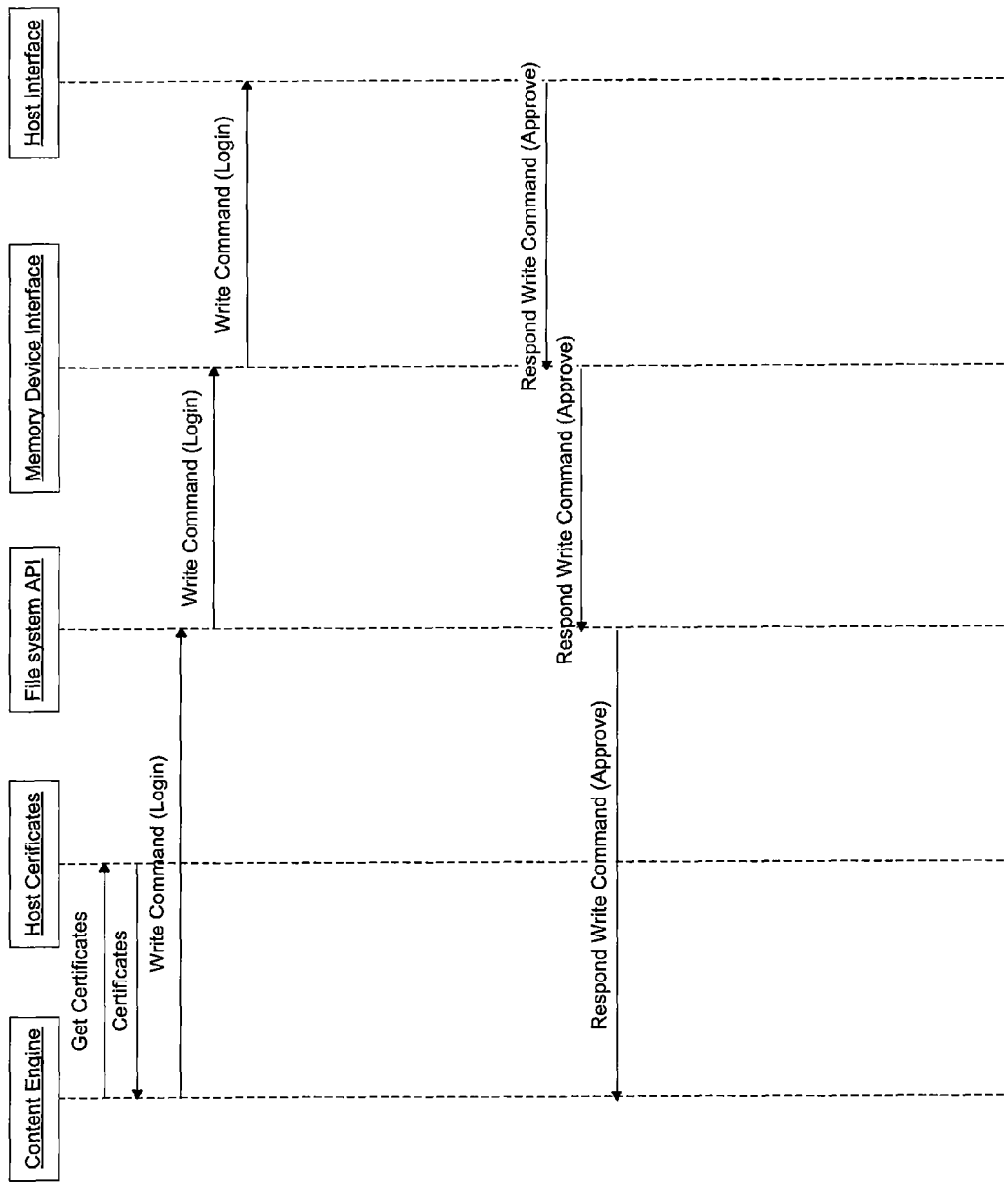
Figure 5A:
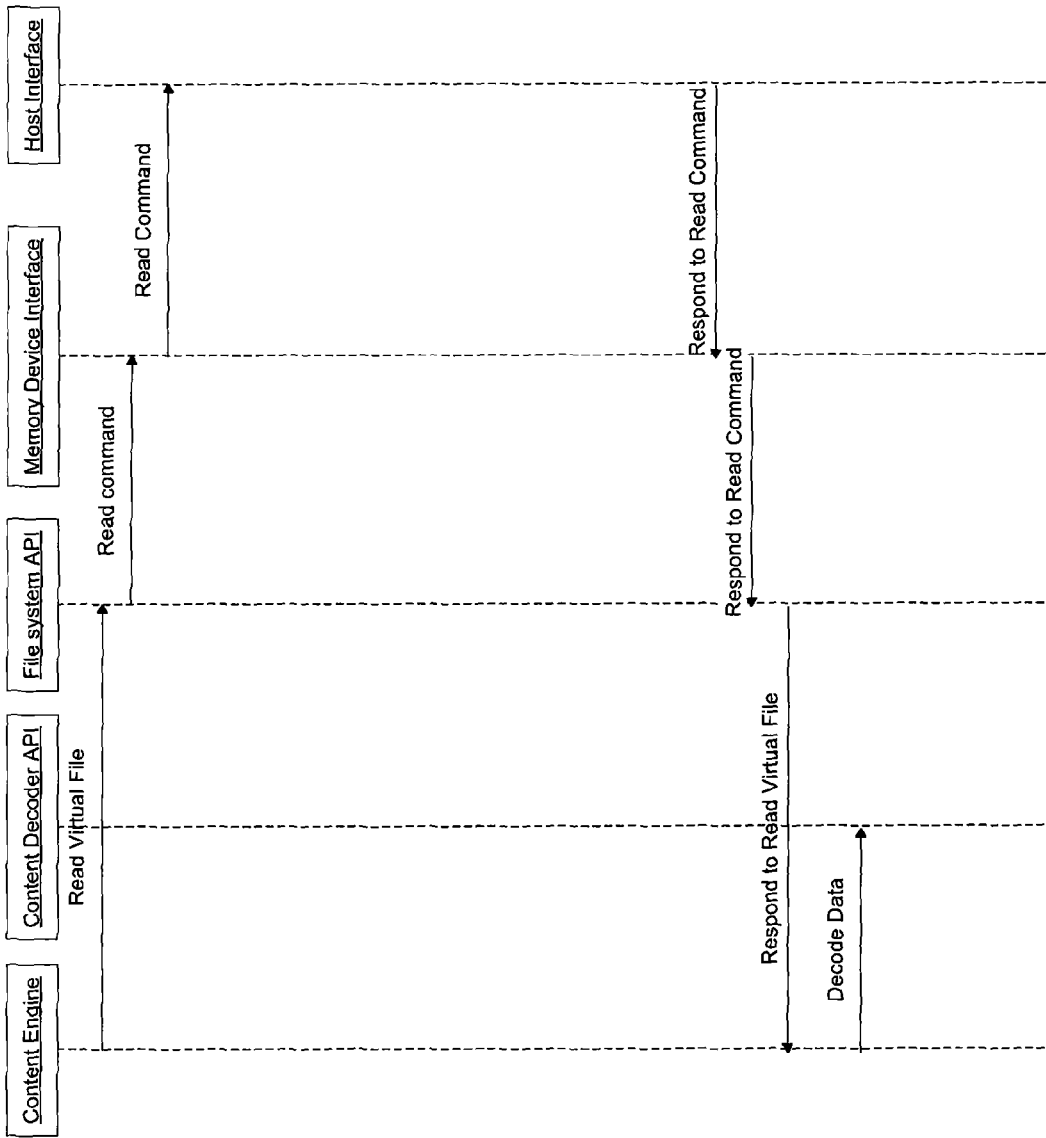
FIGS. 5A and 5B are flow diagrams of a reading-after-log-in process of an embodiment.
Figure 5B:
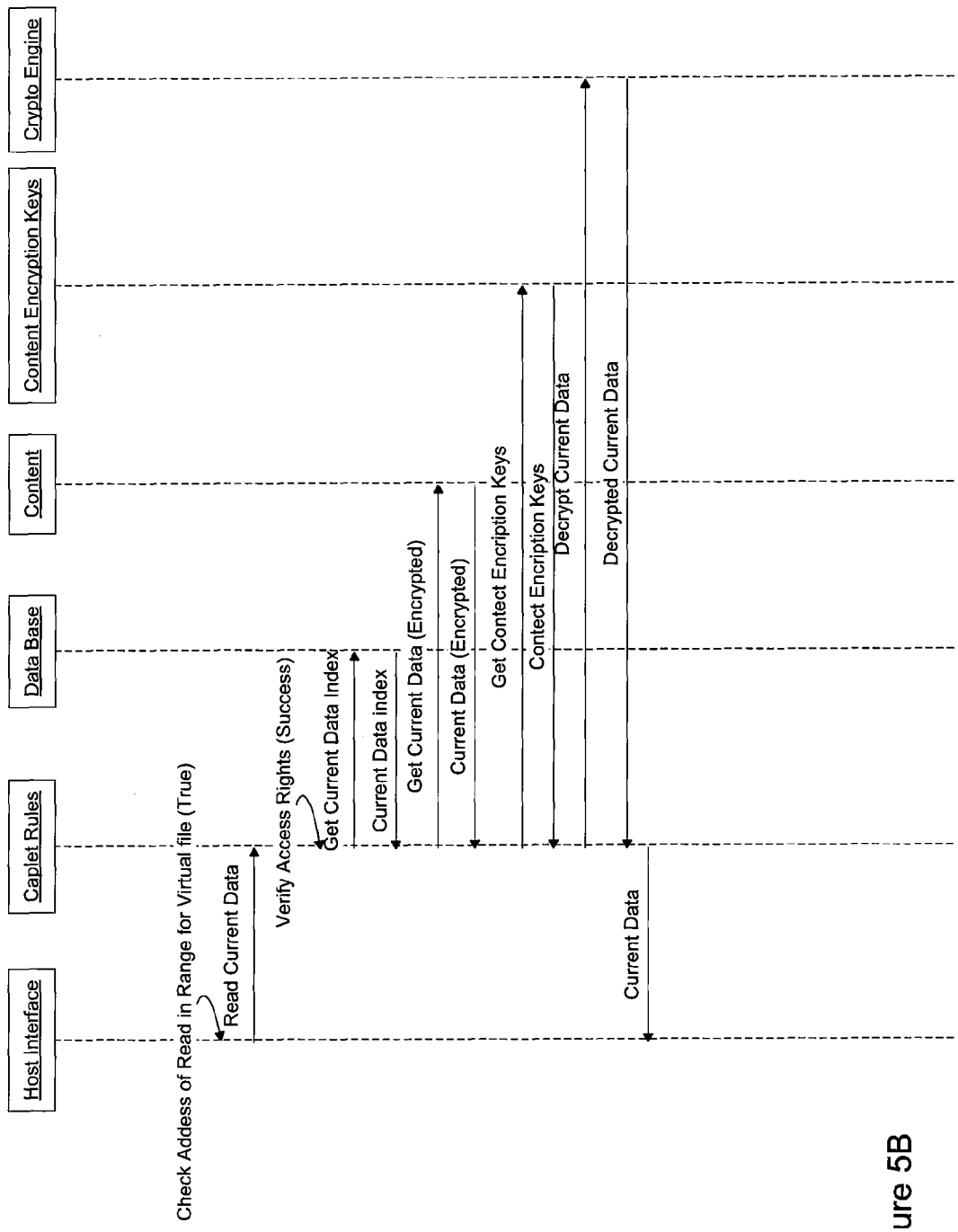
Figure 6A:
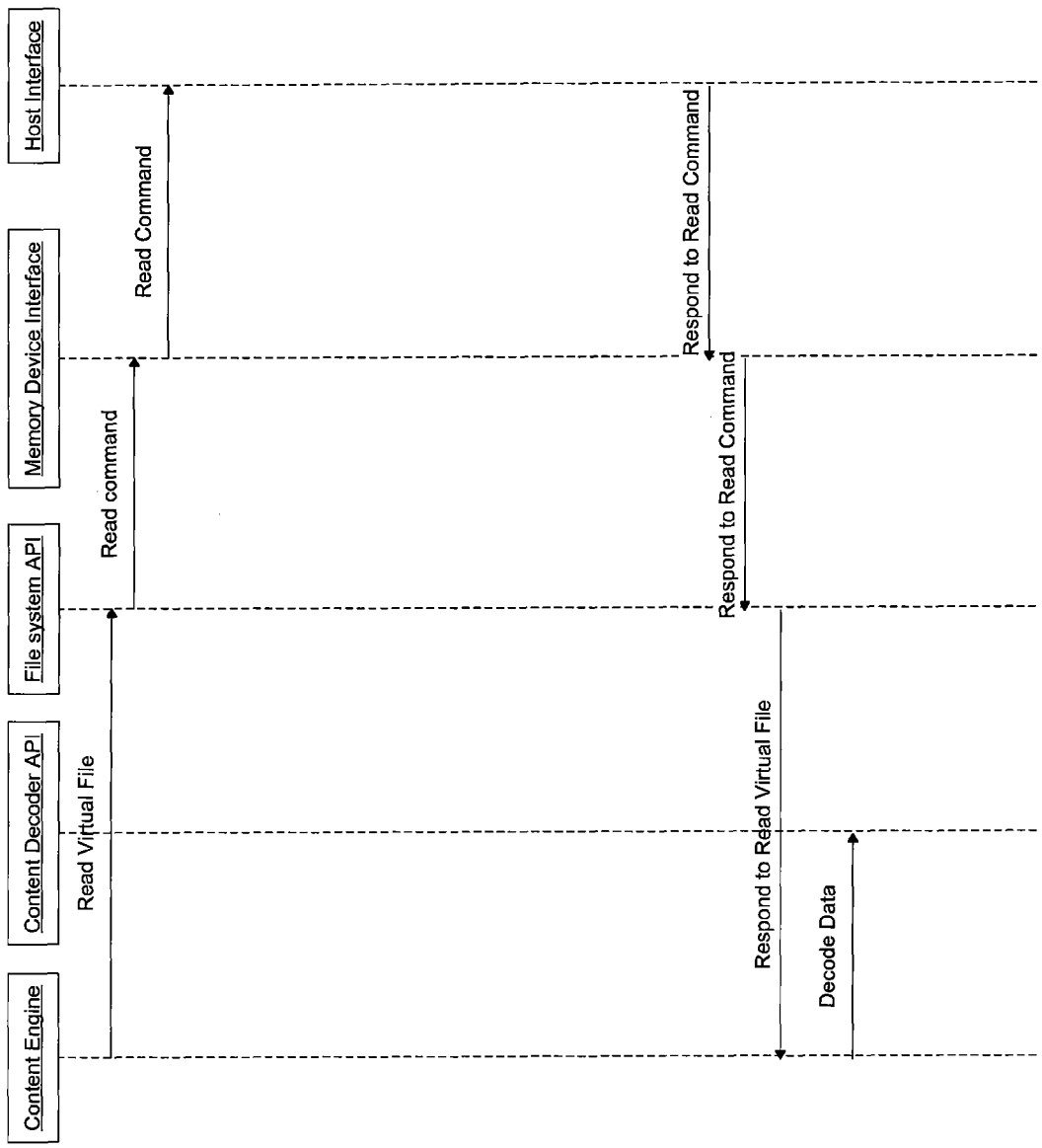
FIGS. 6A and 6B are flow diagrams of a reading-without-log-in process of an embodiment.
Figure 6B:
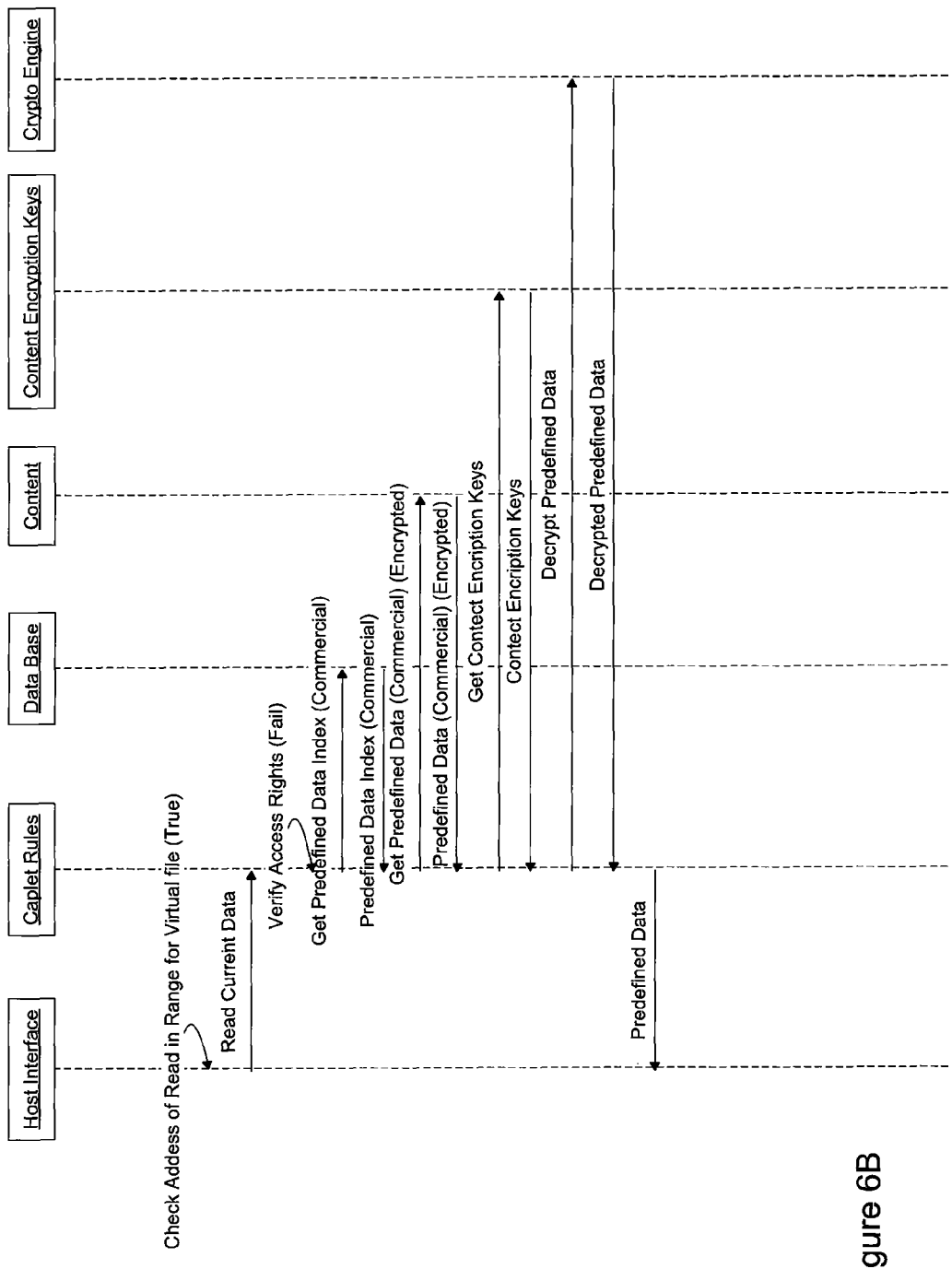
Figure 7:
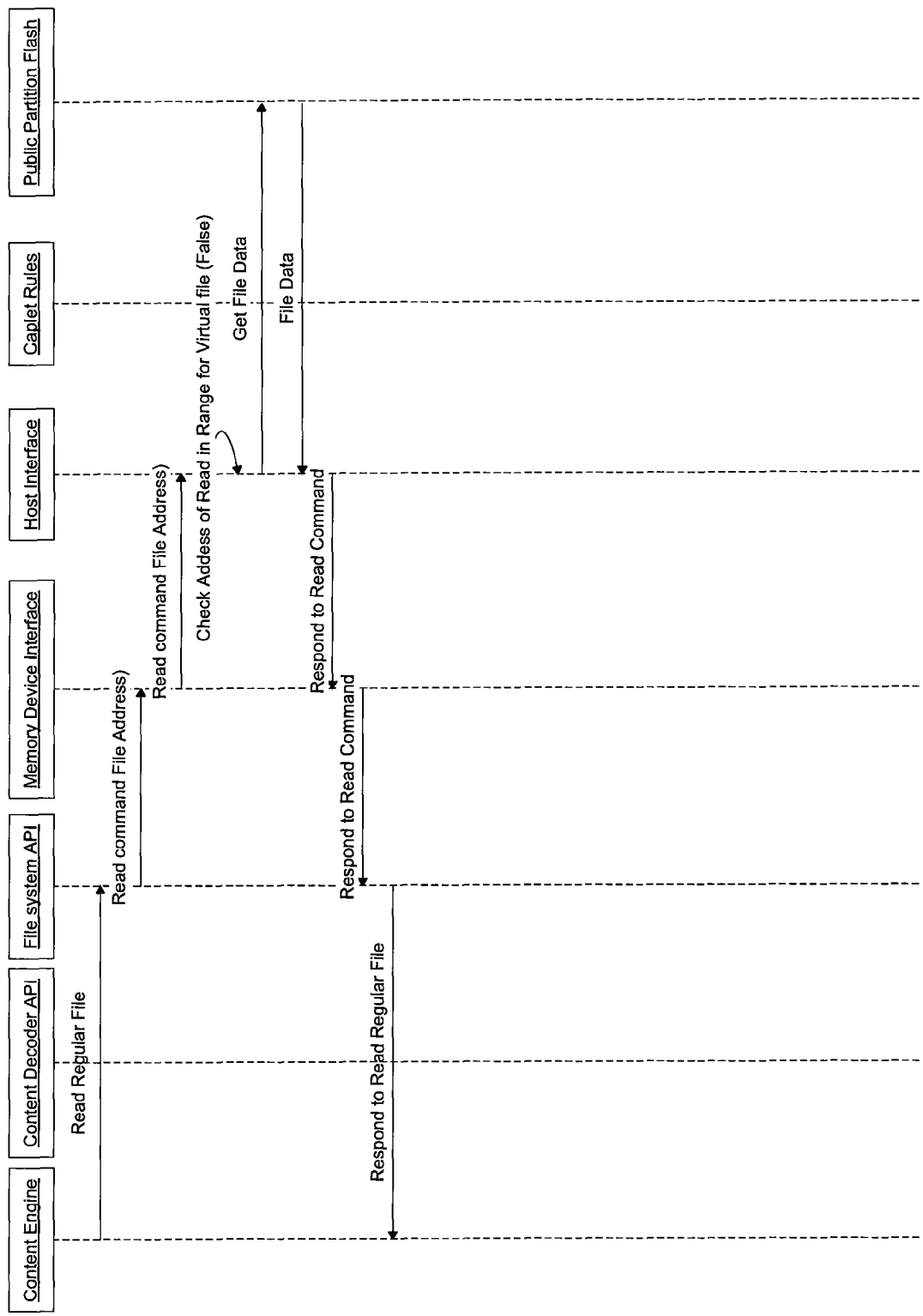
FIG. 7 is a flow diagram of a process for accessing a regular file of an embodiment.
Figure 8A:
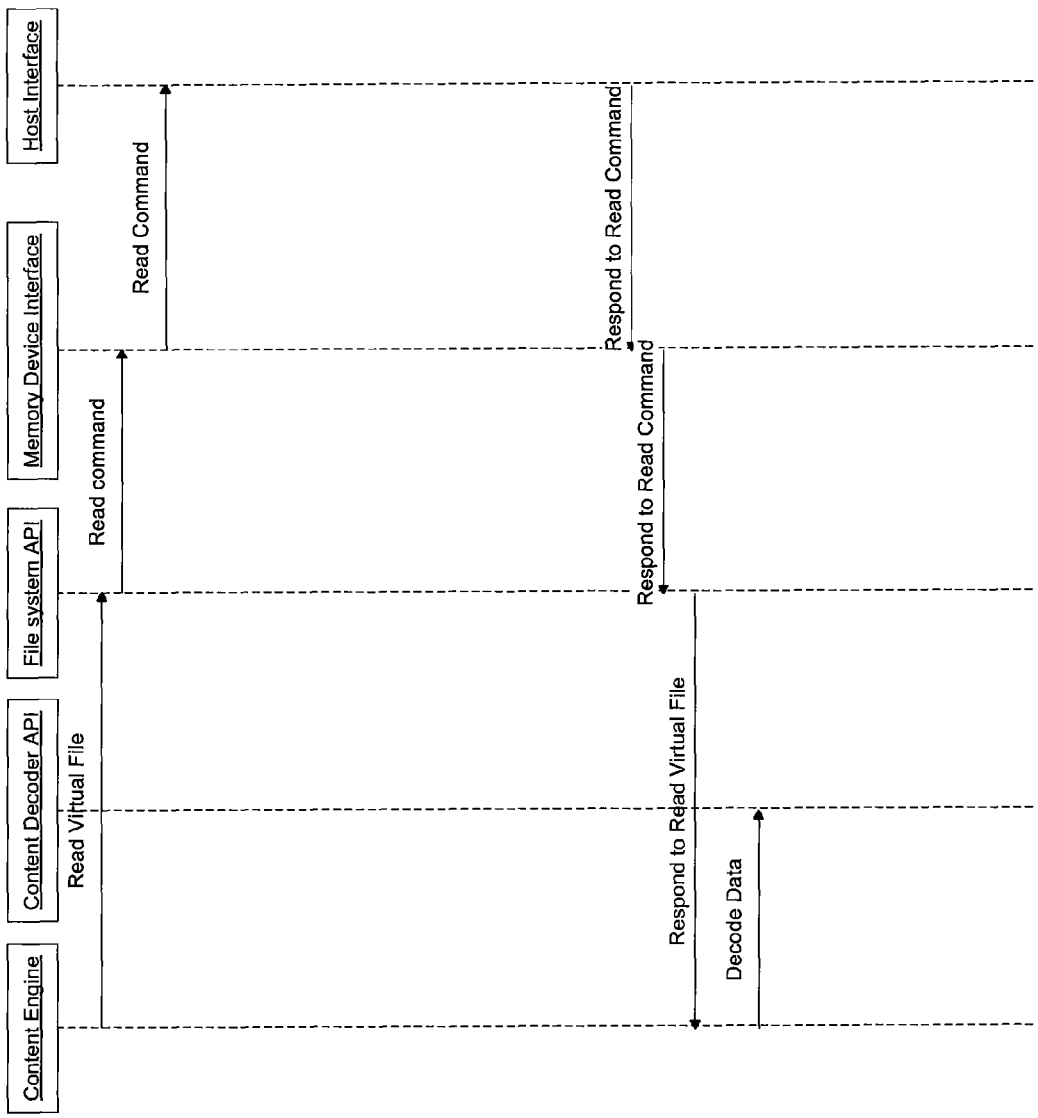
FIGS. 8A and 8B are flow diagrams of a process of an embodiment for accessing data that is out of range and padding a file with additional data.
Figure 8B:
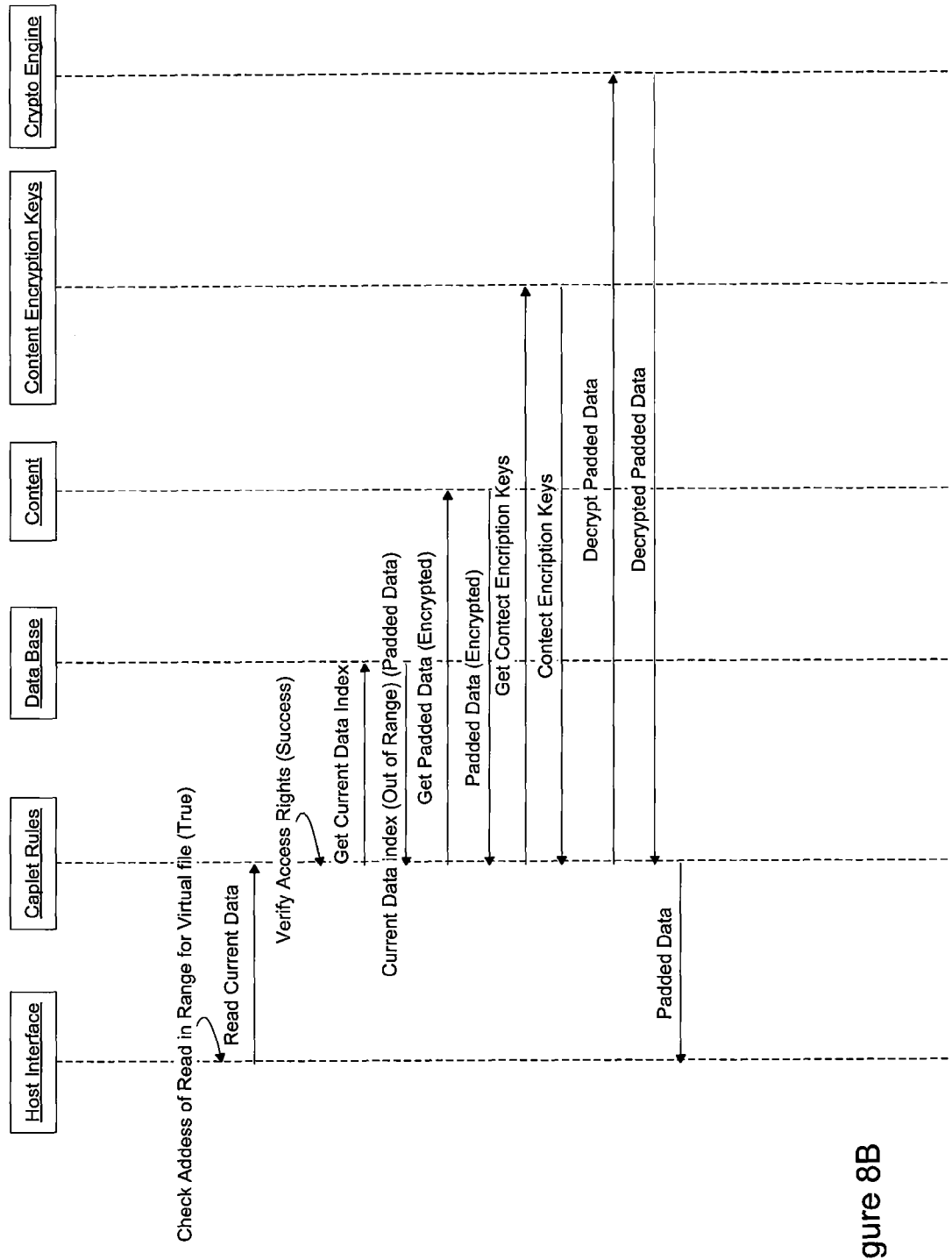
Figure 9A:
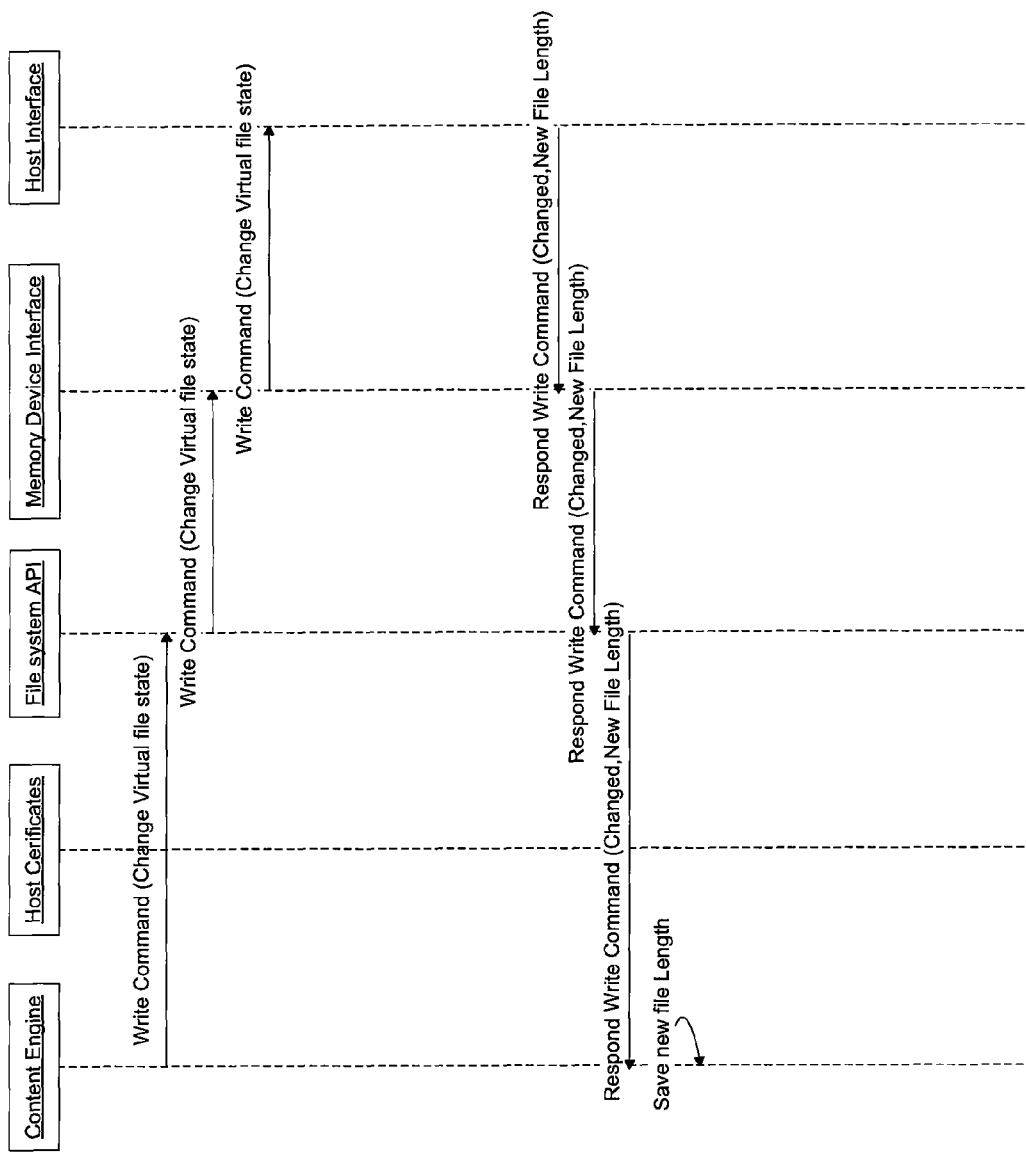
FIGS. 9A and 9B are flow diagrams of a process of determining an actual length of a file of an embodiment.
Figure 9B:
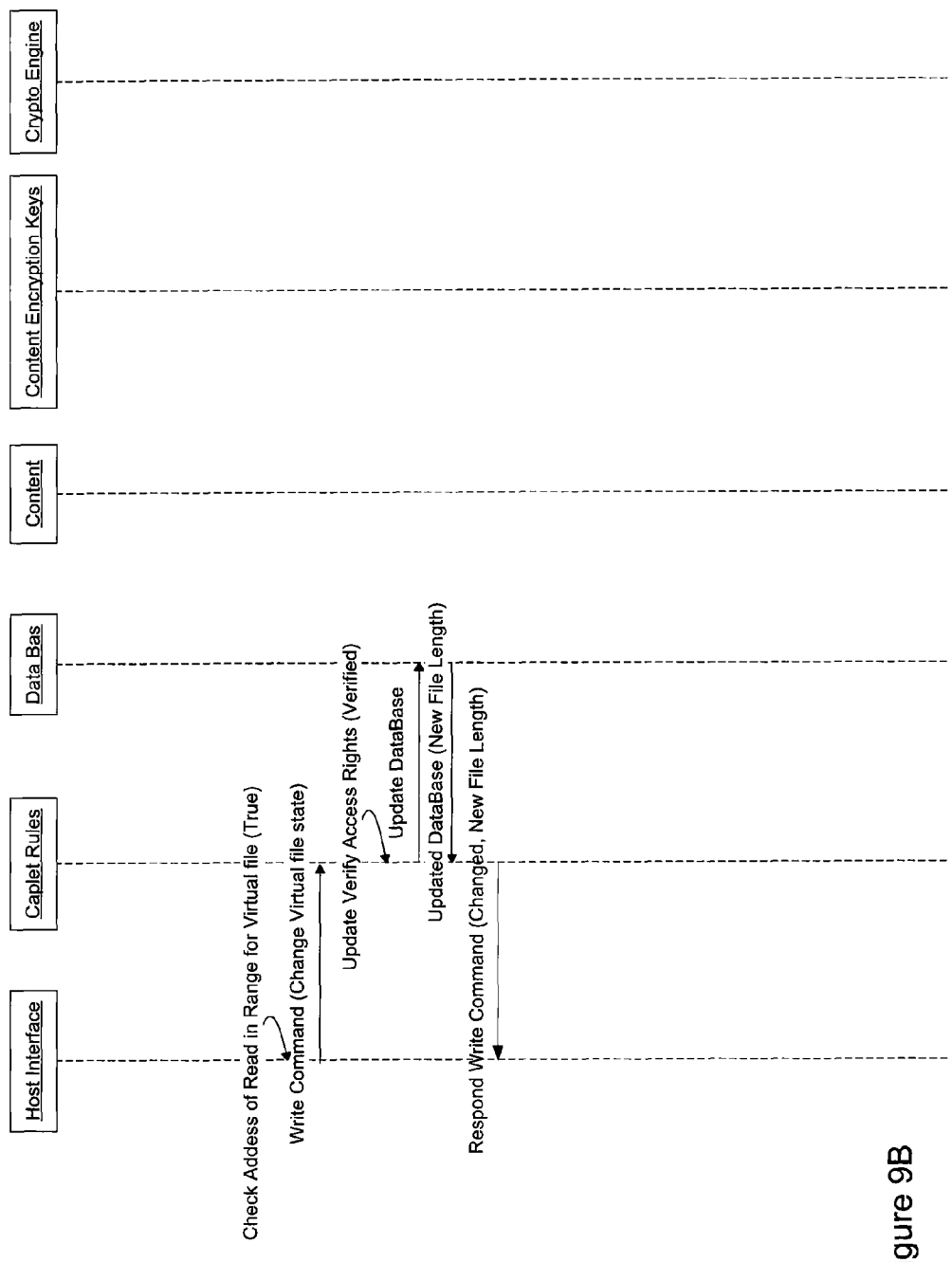
Figure 10A:
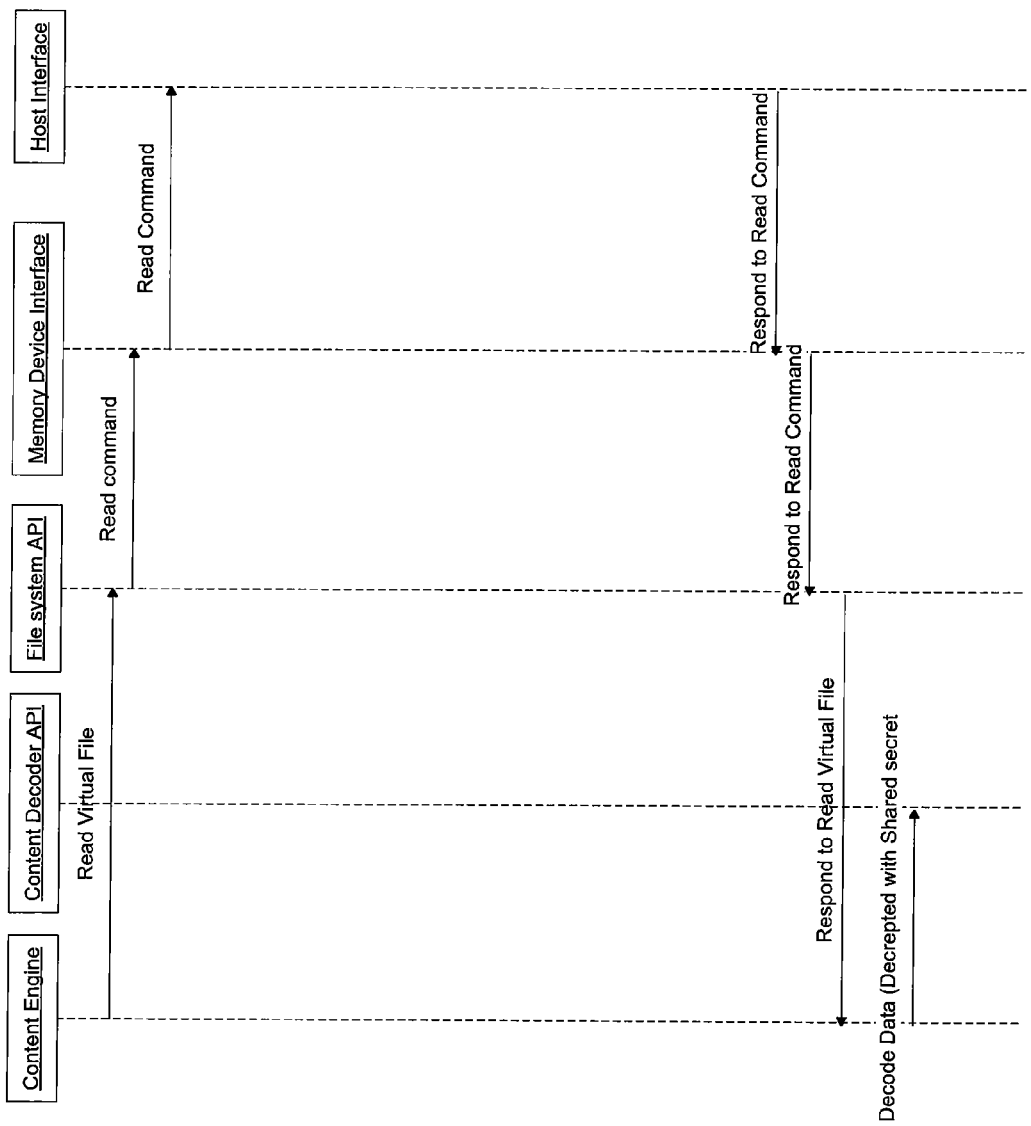
FIGS. 10A and 10B are flow diagrams of a protection process of an embodiment using encryption.
Figure 10B:
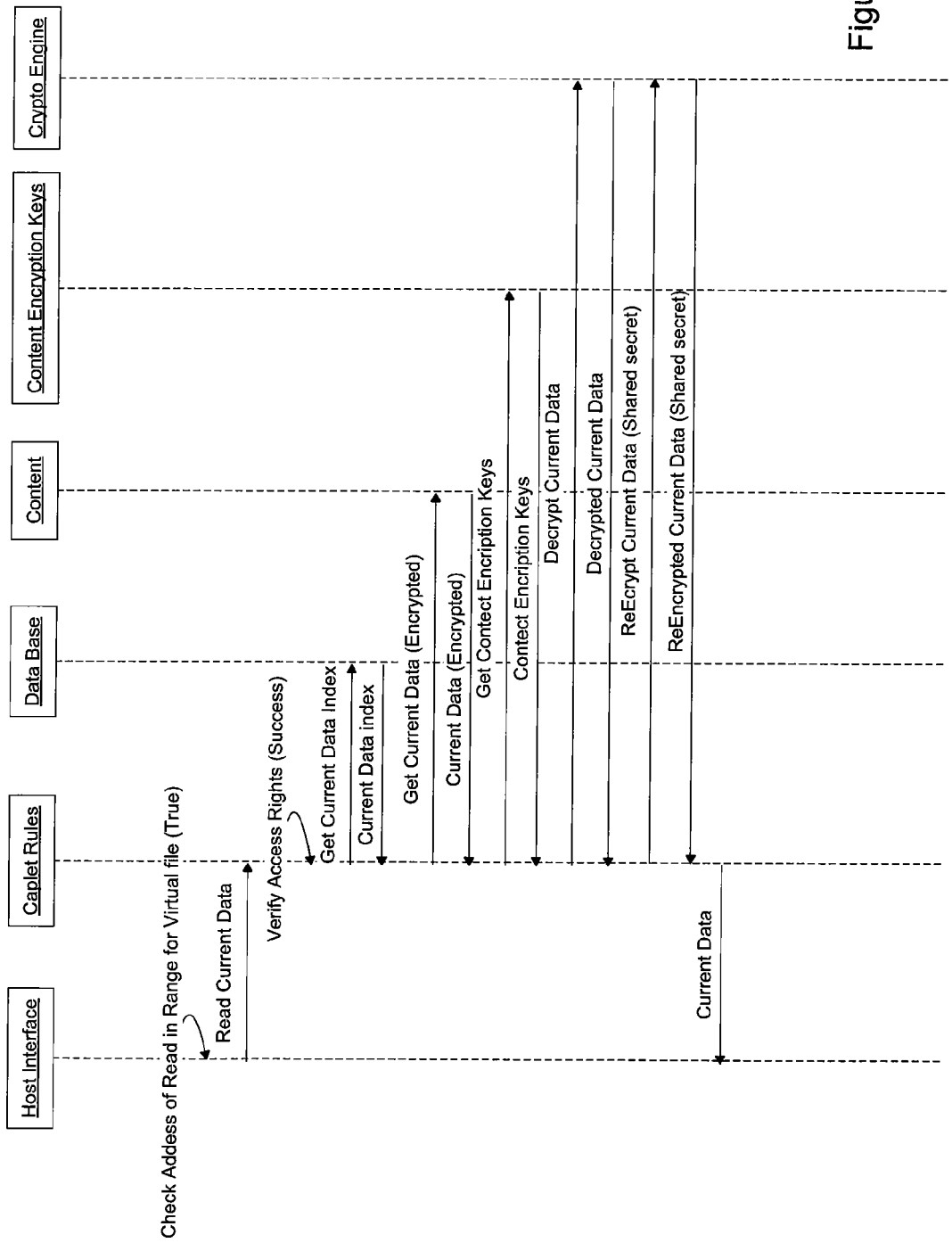
Figure 11A:
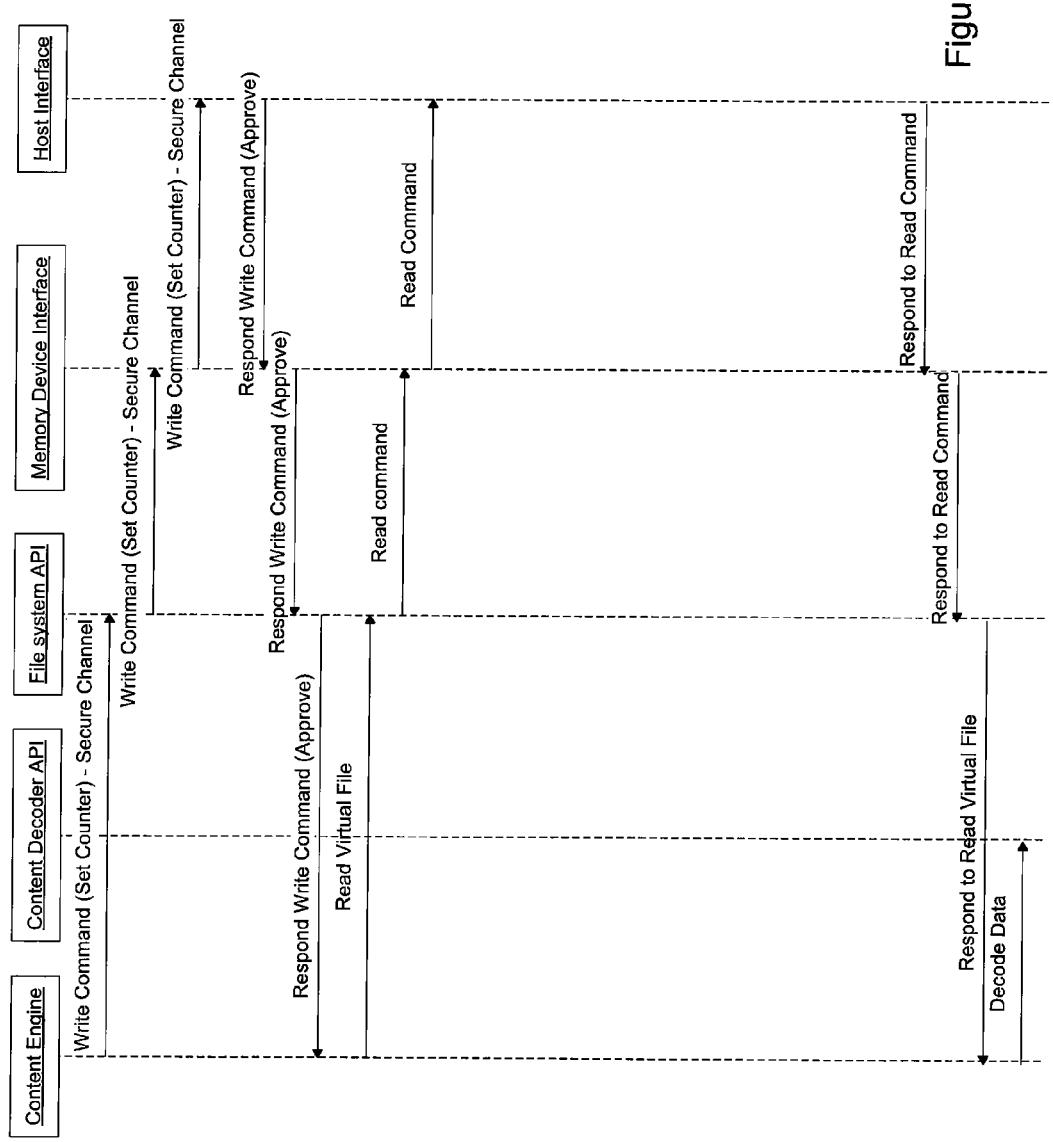
FIGS. 11A and 11B are flow diagrams of a protection process of an embodiment using a counter.
Figure 11B:
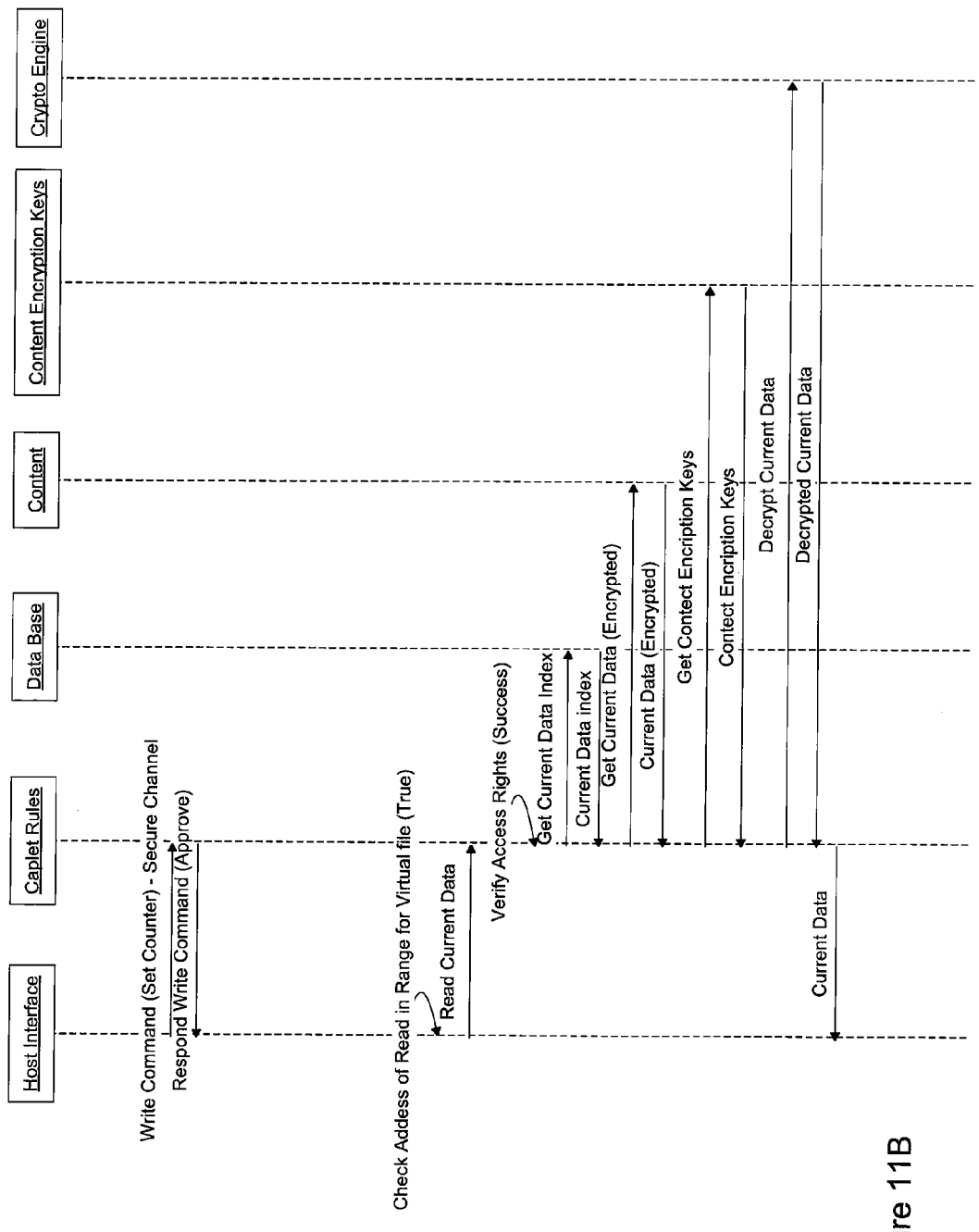
Figure 12A:
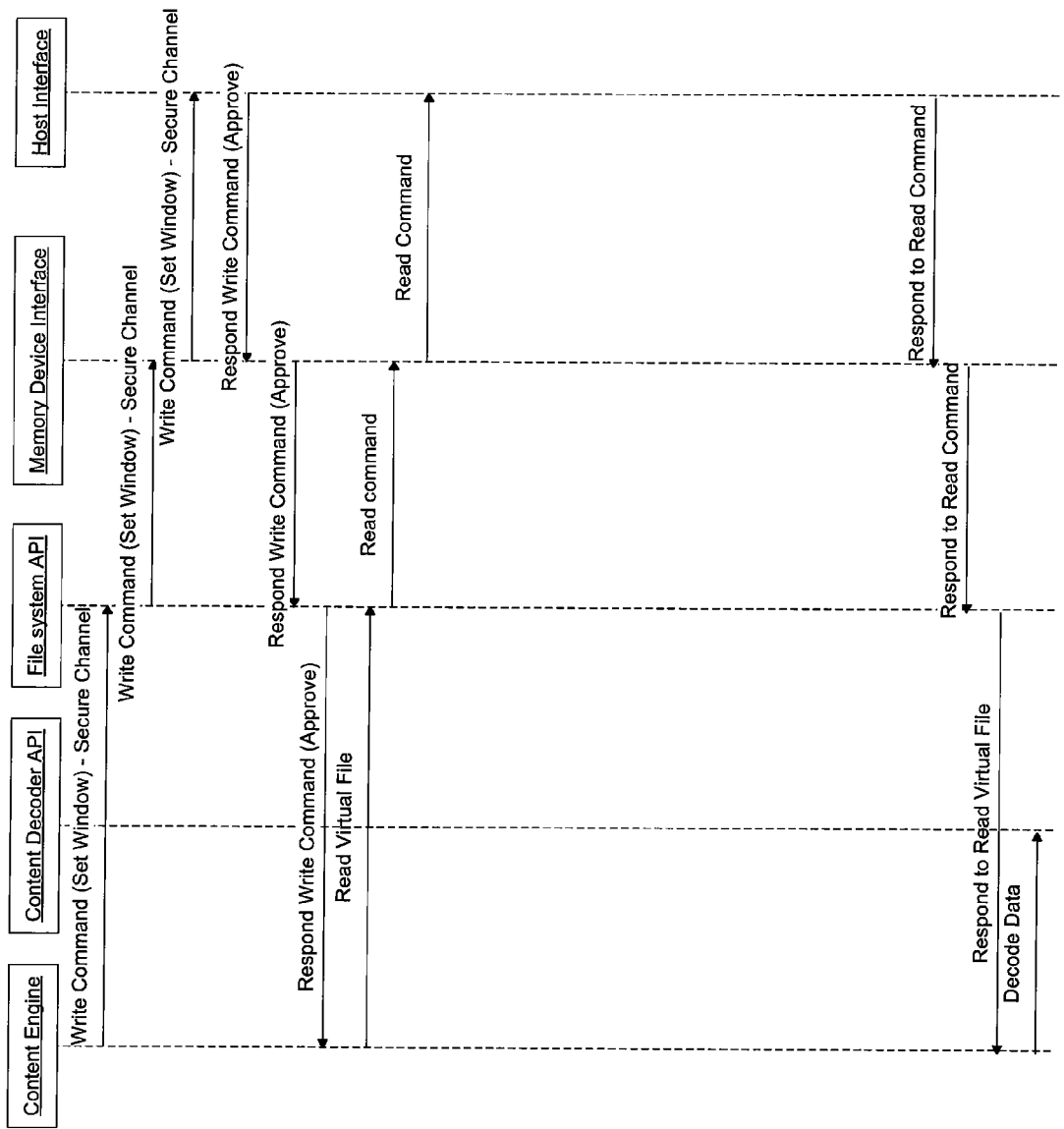
FIGS. 12A and 12B are flow diagrams of a protection process of an embodiment using a sliding window.
Figure 12B:
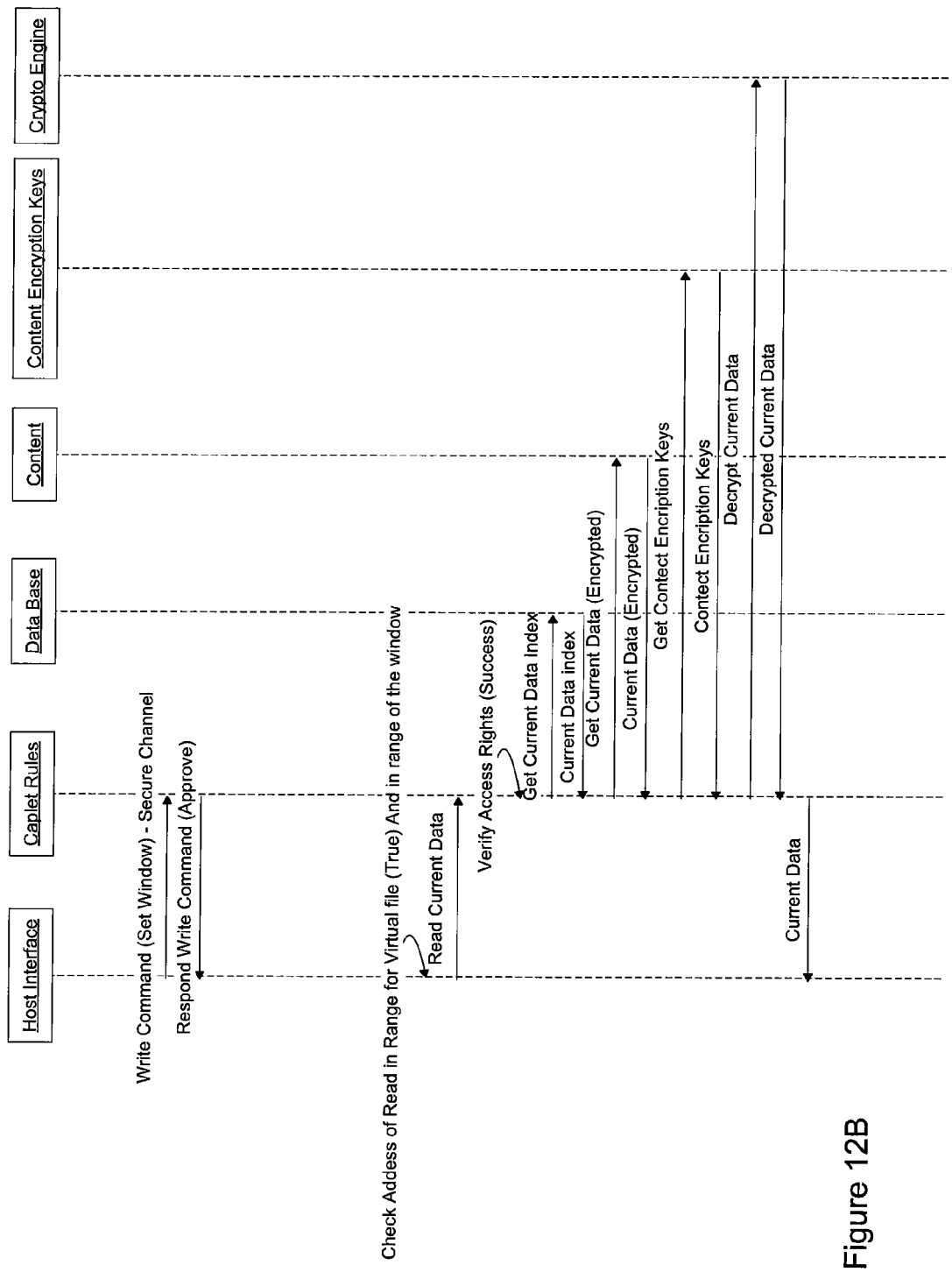
Figure 13A:
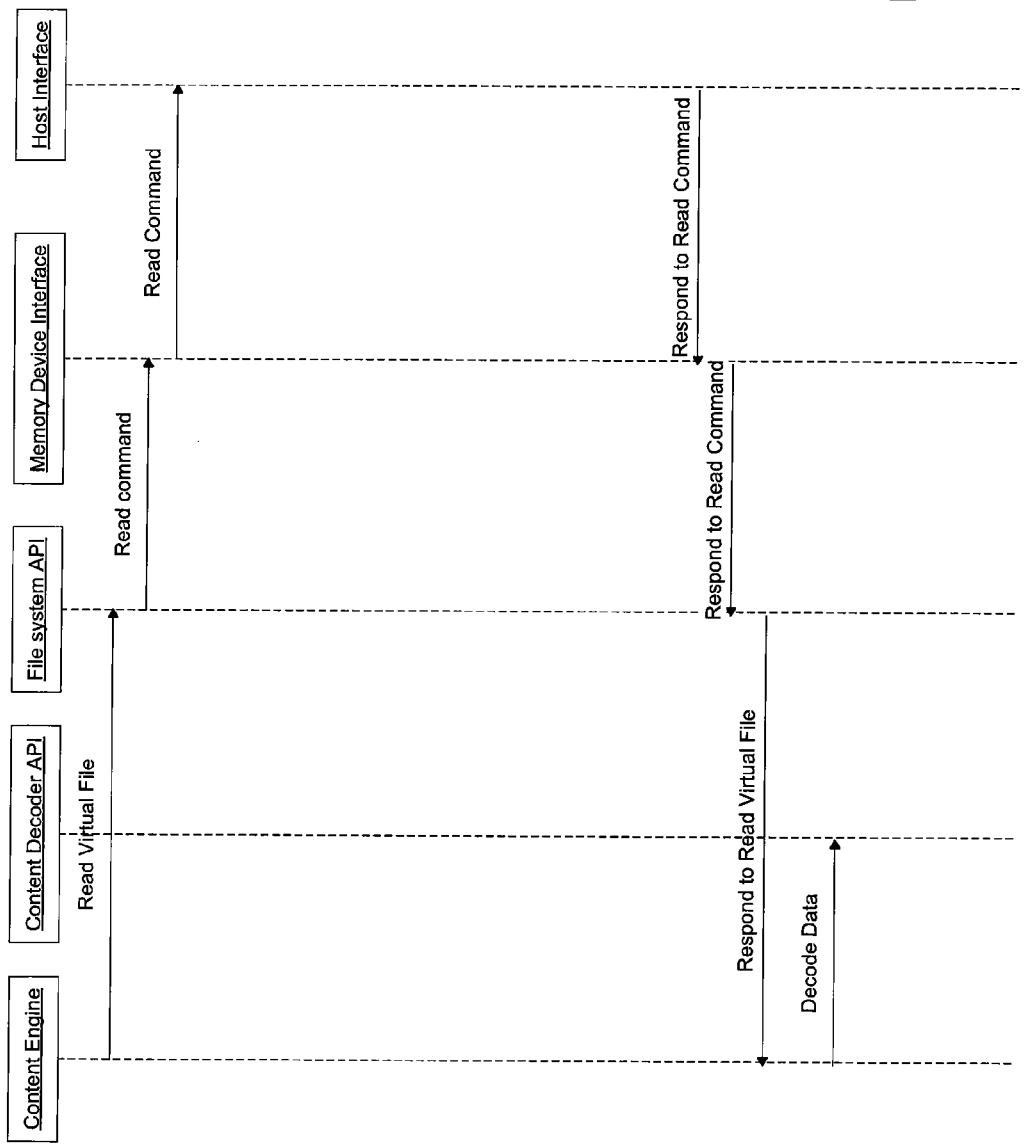
FIGS. 13A and 13B are flow diagrams of a process of an embodiment for data rate control.
Figure 13B:
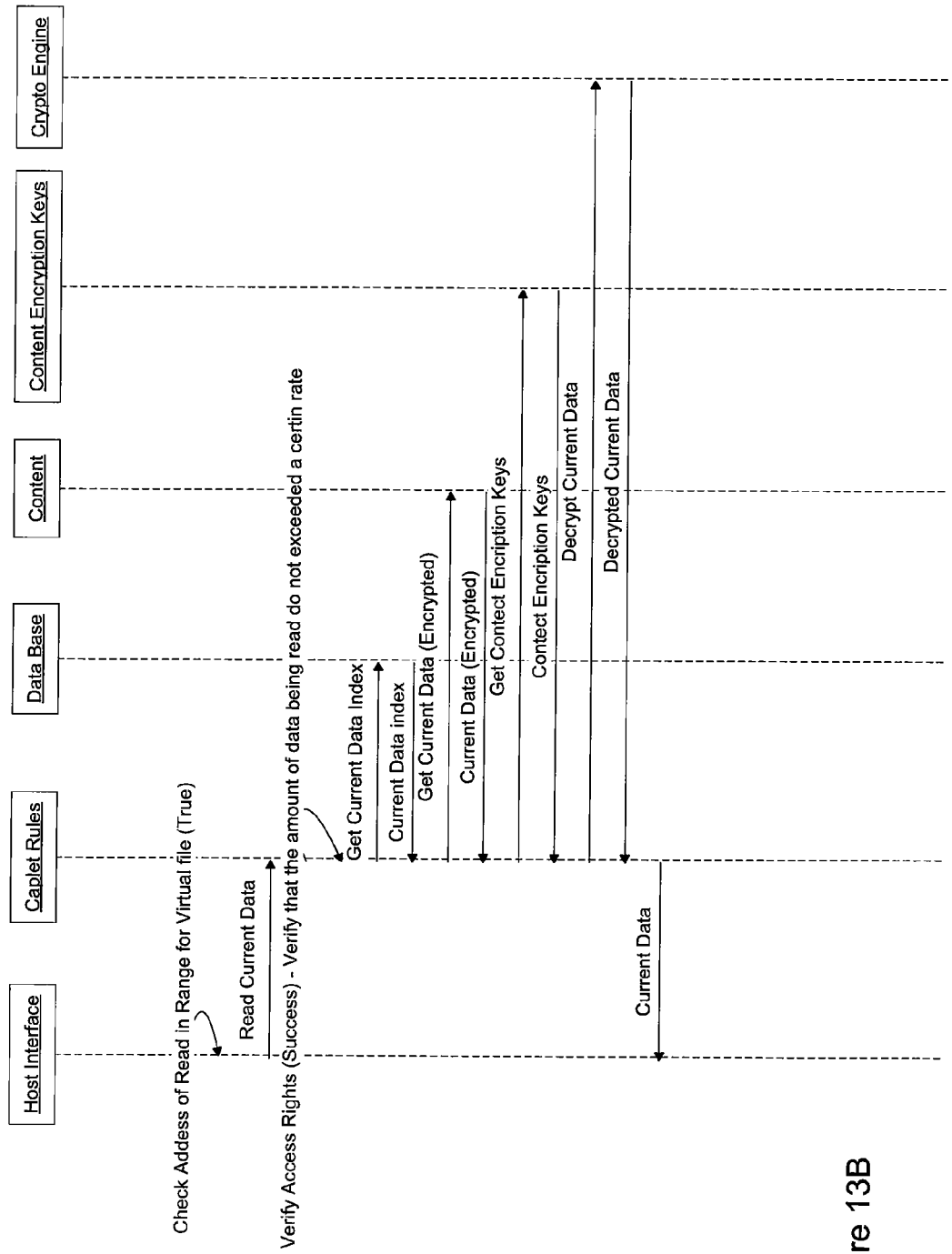
Figure 14B:
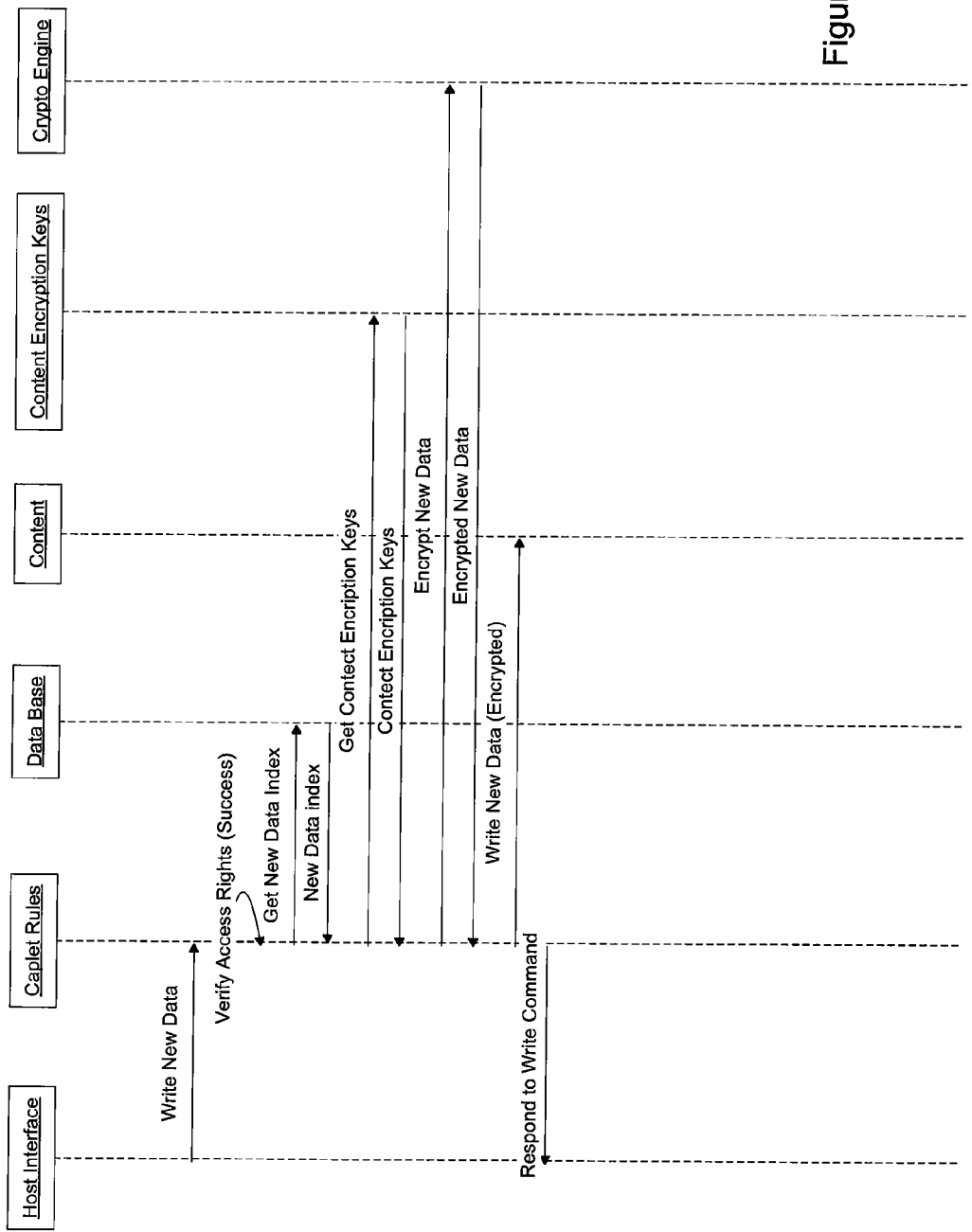

FIG. 4A to 14B are flow diagrams of several exemplary process flows of an embodiment using the memory device 300 and host 350 in FIGS. 3A and 3B. Specifically, FIGS. 4A and 4B are flow diagrams of a log-in process of an embodiment, FIGS. 5A and 5B are flow diagrams of a reading-after-log-in process of an embodiment, FIGS. 6A and 6B are flow diagrams of a reading-without-log-in process of an embodiment, FIG. 7 is a flow diagram of a process for accessing a regular file of an embodiment, FIGS. 8A and 8B are flow diagrams of a process of an embodiment for accessing data that is out of range and padding a file with additional data, FIGS. 9A and 9B are flow diagrams of a process of determining an actual length of a file of an embodiment, FIGS. 10A and 10B are flow diagrams of a protection process of an embodiment using encryption, FIGS. 11A and 11B are flow diagrams of a protection process of an embodiment using a counter, FIGS. 12A and 12B are flow diagrams of a protection process of an embodiment using a sliding window, FIGS. 13A and 13B are a flow diagrams of a process of an embodiment for data rate control, and FIGS. 14A and 14B are flow diagrams of a process of an embodiment for adding content.

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for using a virtual file in a public memory area to access a plurality of protected files in a private memory area, the method comprising:

performing in a controller of a storage device in communication with a host, wherein the storage device has a public memory area and a private memory area:

receiving a request from the host for access to the virtual file in the public memory area, wherein a database stored in the storage device associates the virtual file with the plurality of protected files stored in the private memory area and specifies an order in which the plurality of protected files are to be provided to the host in response to requests from the host for access to the virtual file;

responding to the request for access to the virtual file by selecting and providing the host with access to one of the plurality of protected files stored in the private memory area according to the order specified in the database; and receiving an additional request from the host for access to the virtual file, wherein the controller responds to the additional request by selecting and providing the host with access to a different one of the plurality of protected files stored in the private memory area according to the order specified in the database;

wherein the controller, the public memory area, and the private memory area are all local to the storage device; and wherein the virtual file corresponds to different protected files at different times according to the order specified in the database, wherein each time the host requests access to the virtual file, the controller provides the host with a different one of the plurality of protected files according to the order specified in the database.

2. The method of claim 1, wherein responding to the request and receiving the additional request are performed if the host has been authenticated to the storage device, and wherein the controller responds to the request by providing a dedicated message if the host has not been authenticated to the storage device.

3. The method of claim 1, wherein the size of the virtual file is at least as large as the size of the largest protected file.

4. The method of claim 3 further comprising providing the host with the size of the selected protected file.

5. The method of claim 3, wherein the size of the selected protected file is less than the size of the virtual file, and wherein the method further comprises padding the protected file with data to accommodate the difference in sizes.

6. The method of claim 1, wherein the virtual file is allocated to physical areas in the public storage area.

7. The method of claim 1, wherein the virtual file is not allocated to physical areas in the public storage area.

8. The method of claim 1, wherein the protected file is accessed using a dedicated file system.

9. The method of claim 1, wherein the request from the host comprises a compound command of two or more commands.

10. The method of claim 1 further comprising performing at least one of the following:

modifying a protected file stored in the private memory area by writing modified data to the virtual file; and adding a new protected file to the private memory area by writing the new protected file to the virtual file.

11. The method of claim 1, wherein the protected file is encrypted.

12. The method of claim 1 further comprising using a counter to protect the virtual file from being copied.

13. The method of claim 1 further comprising using a data rate control mechanism to protect the virtual file from being copied.

14. The method of claim 1 further comprising using a sliding window to protect the virtual file from being copied.

15. A storage device comprising:

a public memory area configured to store a virtual file;

a private memory area configured to store a plurality of protected files and a database that associates the virtual file with the plurality of protected files and specifies an order in which the plurality of protected files are to be provided to a host in communication with the storage device in response to requests from the host for access to the virtual file; and a controller in communication with the public and private memory areas, wherein the controller is configured to:

receive a request from the host for access to the virtual file in the public memory area, wherein the virtual file is associated with the plurality of protected files stored in the private memory area via the database;

respond to the request for access to the virtual file by selecting and providing the host with access to one of the plurality of protected files stored in the private memory area according to the order specified in the database; and receive an additional request from the host for access to the virtual file, wherein the controller is configured to respond to the additional request by selecting and providing the host with access to a different one of the plurality of protected files stored in the private memory area according to the order specified in the database;

wherein the controller, the public memory area, and the private memory area are all local to the storage device; and wherein the virtual file corresponds to different protected files at different times according to the order specified in the database, wherein each time the host requests access to the virtual file, the controller provides the host with a different one of the plurality of protected files according to the order specified in the database.

16. The storage device of claim 15, wherein the controller is operative to respond to the request and receive the additional request if the host has been authenticated to the storage device, and wherein the controller is operative to respond to the request by providing a dedicated message if the host has not been authenticated to the storage device.

17. The storage device of claim 15, wherein the size of the virtual file is at least as large as the size of the largest protected file.

18. The storage device of claim 17, wherein the controller is further operative to provide the host with the size of the selected protected file.

19. The storage device of claim 17, wherein the size of the selected protected file is less than the size of the virtual file, and wherein the controller is further operative to pad the protected file with data to accommodate the difference in sizes.

20. The storage device of claim 15, wherein the virtual file is allocated to physical areas in the public storage area.

21. The storage device of claim 15, wherein the virtual file is not allocated to physical areas in the public storage area.

22. The storage device of claim 15, wherein the protected file is accessed using a dedicated file system.

23. The storage device of claim 15, wherein the request from the host comprises a compound command of two or more commands.

24. The storage device of claim 15, wherein the controller is further operative to perform at least one of the following:
   modify a protected file stored in the private memory area by writing modified data to the virtual file; and
   add a new protected file to the private memory area by writing the new protected file to the virtual file.

25. The storage device of claim 15, wherein the protected file is encrypted.

26. The storage device of claim 15, wherein the controller is further operative to use a counter to protect the virtual file from being copied.

27. The storage device of claim 15, wherein the controller is further operative to use a data rate control mechanism to protect the virtual file from being copied.

28. The storage device of claim 15, wherein the controller is further operative to use a sliding window to protect the virtual file from being copied.

* * * * *